United States Patent [19]

Edwards et al.

[11] E Re. 28,701

[45] Reissued Jan. 27, 1976

[54] DISPENSING SYSTEM AND SECURITY CARD FOR USE THEREWITH

[75] Inventors: John David Edwards, Sanderstead; Leonard Perkins; John Henry Donald, both of London; Peter Lee Chappell, Doodcrest K I; Sean Benjamin Newcombe, Old Coulsdon; Malcolm David Roe, London, all of England

[73] Assignee: Burroughs Corporation, Detroit, Mich.

[22] Filed: Sept. 30, 1974

[21] Appl. No.: 510,522

Related U.S. Patent Documents

Reissue of:

[64] Patent No.: 3,697,729
Issued: Oct. 10, 1972
Appl. No.: 68,650
Filed: Sept. 1, 1970

[30] Foreign Application Priority Data

Sept. 9, 1969 United Kingdom ..... 44452/69

[52] U.S. Cl. ..... 235/61.7 B; 194/46; 222/2; 235/61.12 M

[51] Int. Cl.². G06K 7/10; G07F 1/06; G07F 11/00; G06K 19/06

[58] Field of Search ..... 194/4; 235/61.7 B, 61.12 M; 340/149 A; 222/2; 283/7

[56] References Cited

UNITED STATES PATENTS

| | | | |
|---|---|---|---|
| 3,039,582 | 6/1962 | Simjian | 235/61.7 B |
| 3,061,143 | 10/1962 | Simjian | 235/61.7 B |
| 3,221,304 | 11/1965 | Enikeieff et al. | 235/61.7 B |
| 3,245,697 | 4/1966 | Nugent | 283/7 |
| 3,401,830 | 9/1968 | Mathews | 235/61.7 B |
| 3,564,210 | 2/1971 | Presti | 235/61.7 B |
| 3,611,293 | 10/1971 | Constable et al. | 235/61.7 B |
| 3,700,862 | 10/1972 | Snook et al. | 235/61.12 M |

FOREIGN PATENTS OR APPLICATIONS

| | | |
|---|---|---|
| 1,441,941 | 5/1956 | France |
| 1,506,880 | 11/1967 | France |
| 1,529,463 | 5/1968 | France |
| 1,538,927 | 7/1968 | France |

*Primary Examiner*—Daryl W. Cook
*Attorney, Agent, or Firm*—Lynn L. Augspurger; Edwin W. Uren

[57] ABSTRACT

Apparatus for dispensing items desired by the user in response to the introduction of a valid security card and additional predetermined information. The apparatus includes means for reading data from the security card, keyboard means for introducing additional information and electronic logic for determining the validity of the card and the validity of the predetermined information. A security card is provided including a first area to record the number of uses of said card and a second area to record the date of the last use. The apparatus includes logic to prevent dispensing and to retain the card if the card has been used more than a predetermined number of times or more than once within a predetermined time interval.

51 Claims, 19 Drawing Figures

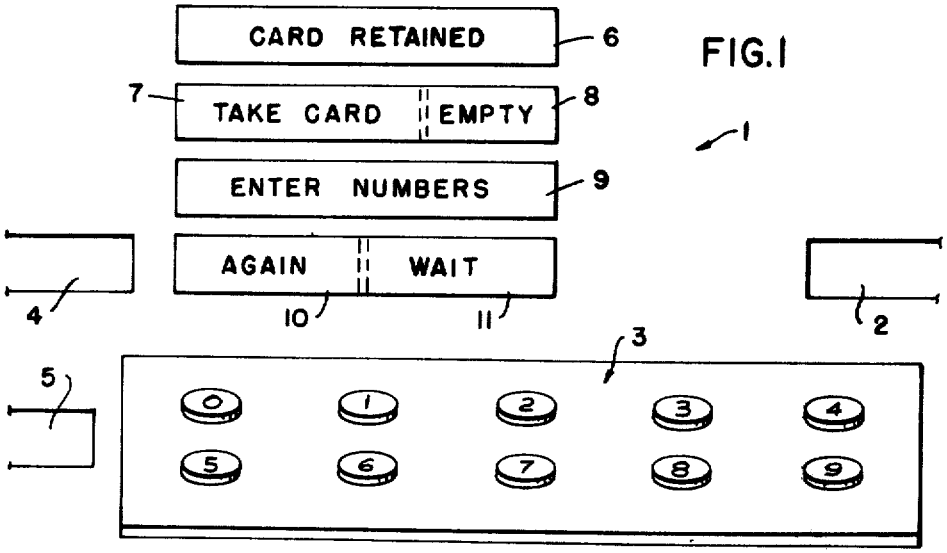
FIG.1
FIG.2
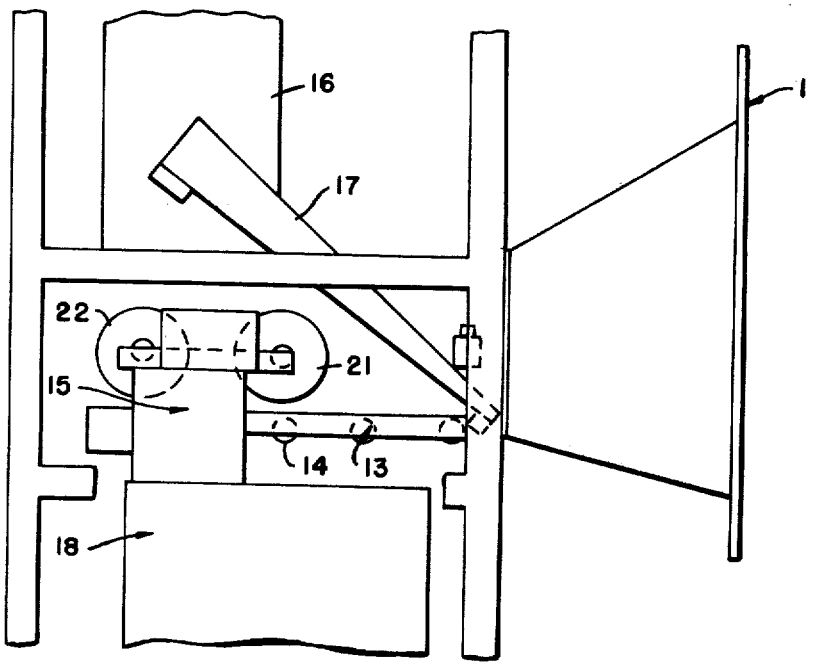

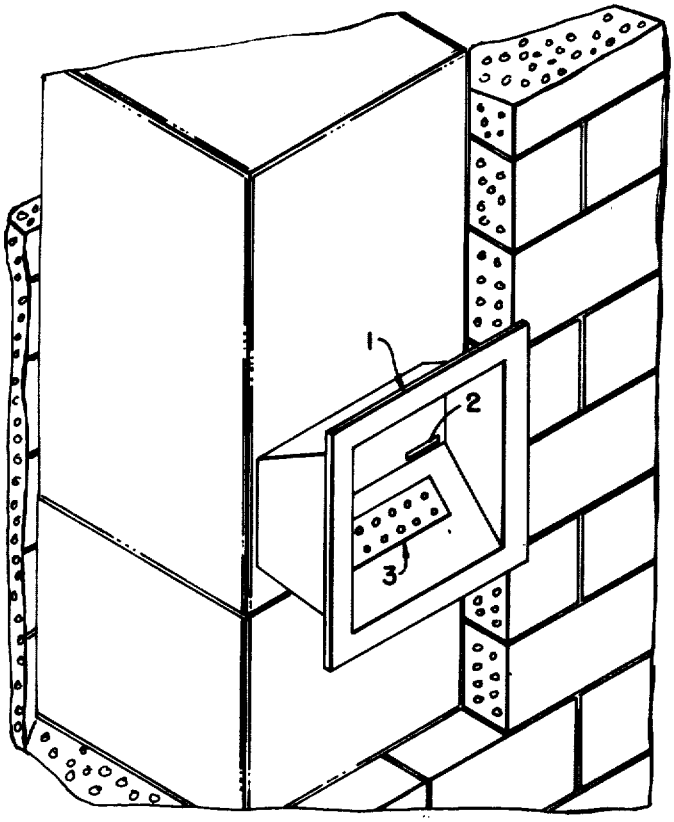
FIG.8
FIG.9
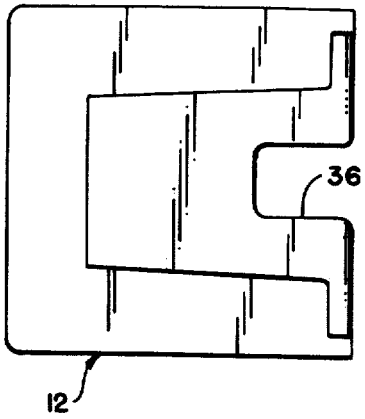
FIG.10
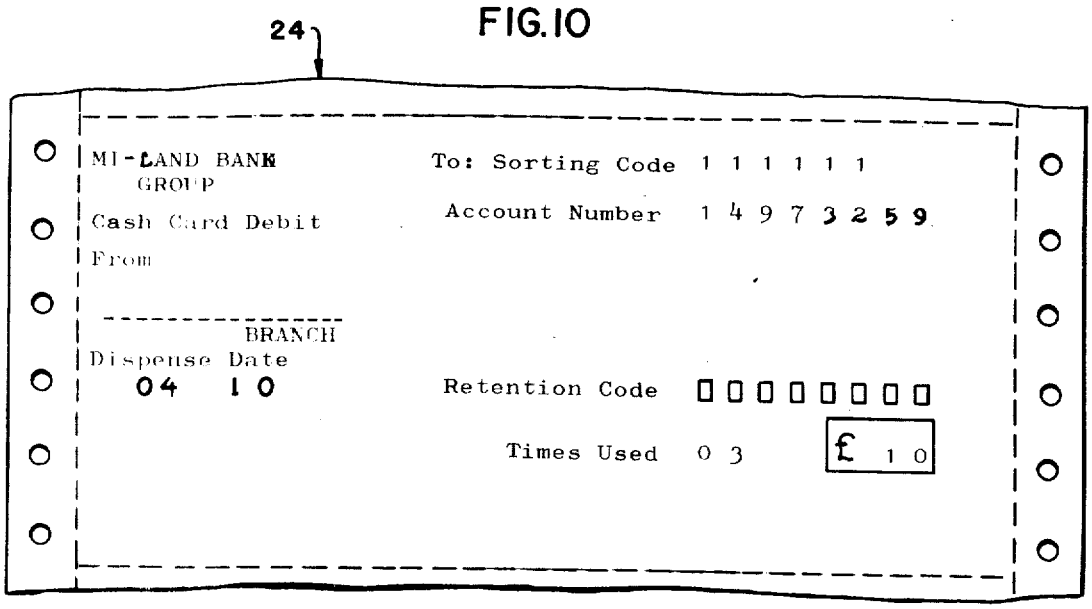

DISPENSING SYSTEM AND SECURITY CARD FOR USE THEREWITH

Matter enclosed in heavy brackets [ ] appears in the original patent but forms no part of this reissue specification; matter printed in italics indicates the additions made by reissue.

The present invention relates to a dispensing apparatus, system or equipment which is operable in response to the introduction therein of a valid security card and the entering or keying in of predetermined information.

The system or equipment includes security card reading means, and means for determining the validity or invalidity of the security card.

There is also provided means for permitting a user of the system or equipment to key in certain predetermined information, which may, for example, be information which has been memorized by the user and is known only to the true user or customer and the company or bank which provides or makes available such system or equipment.

There is also provided means for determining the validity or invalidity or the predetermined information, and means for dispensing the items, such as currency, desired by the user only if the security card and keyed-in information are both determined to be valid.

The invention also relates to a security card or credit card which is provided with areas having magnetically recorded data, such as account numbers and code numbers.

The inventive security card may also be provided with indica bearing a randomly-applied material or characteristic, such as an amount of magnetic material, which is accurately measured or determined before the card is issued to the intended user or customer.

The security card may also be provided with areas for recording therein the number of times the user or customer has successfully used the card, and the date of the most recent successful use of the card.

The inventive apparatus, system or equipment may include means for retaining the security card and for preventing the return of the card to the user or customer after said card has been introduced into the system or equipment a predetermined number of times.

The apparatus, system or equipment may also include means for retaining the security card and for preventing return of the card to the user when the card is or has been introduced into the system more than a predetermined number of times within a predetermined time interval.

The apparatus, system, or equipment may also include means for retaining any security card and for preventing return of the card to the user when the user fails to key-in the predetermined information which is correct and/or valid after a predetermined number of attempts to do so.

The invention also contemplates an apparatus, system or equipment wherein the items dispensed by the system or equipment include or comprise currency.

The apparatus, system or equipment may also include means for determining whether or not the value of the items desired by the user exceeds the current balance of funds in the account of the user.

The apparatus, system or equipment may also include means for determining whether or not the value of the items desired by the user exceeds a predetermined amount of credit to be extended to the user.

The invention also contemplates the feature wherein various data or information is magnetically recorded on the security card in a scrambled or coded form and/or arrangement; and the means for determining the validity or invalidity of the security card which is introduced into the system or equipment includes means for electronically unscrambling or decoding the scrambled or coded data or information.

SUMMARY OF THE INVENTION

In accordance with the present invention, there is provided an apparatus for dispensing items desired by a user of the apparatus in response to the introduction into the apparatus of a valid security card and the entering into the apparatus of predetermined information. The apparatus includes first means for permitting the user to introduce a security card into the apparatus, and second means for determining the validity or invalidity of the security card. There is also provided third means for reading data which is present on the security card, and fourth means for permitting the user to enter into the apparatus the predetermined information. The apparatus also includes a fifth means for determining the validity or invalidity of the predetermined information, and sixth means for dispensing the items desired by the user only after the security card and the predetermined information of both determined by the apparatus to be valid.

In accordance with the present invention, there is also provided a novel article, such as a security or identification card, which includes a body member and a first predetermined area of the body member within which area there has been applied a random quantity of magnetic material.

The article also includes a second predetermined area of the body member within which second area there has been recorded data which is mathematically related to the random quantity of the magnetic material which has been applied within the first predetermined area of the body member.

Various purposes and advantages of the present invention will become apparent to those skilled in the art as the following detailed description of the invention unfolds when the taken in conjunction with the appended drawings wherein like reference numerals denote like elements, and in which:

BRIEF DESCRIPTION OF THE DRAWINGS

FIG. 1 illustrates a front elevational view of a fascia provided in the external wall of a bank for a first embodiment of the present invention;

FIG. 2 illustrates a side elevational view, partly in section, of the embodiment of the novel apparatus as shown in FIG. 1;

FIG. 8 illustrates a front perspective view of the cash dispensing apparatus shown in FIG. 7 wherein the portion of the external wall of the bank is shown in section;

FIG. 9 illustrates a preferred embodiment of the plastic package or clip which is used for holding the dispensed currency;

FIG. 10 illustrates a typical voucher which is printed automatically by the cash dispensing apparatus upon each transaction or use of the apparatus by a customer, and shows a typical sorting code number, account number, branch number, dispense date, retention code, the number of times the security card has been used, and the amount of currency that has been dispensed, if any;

DESCRIPTION OF THE PREFERRED EMBODIMENT

Figure 4:
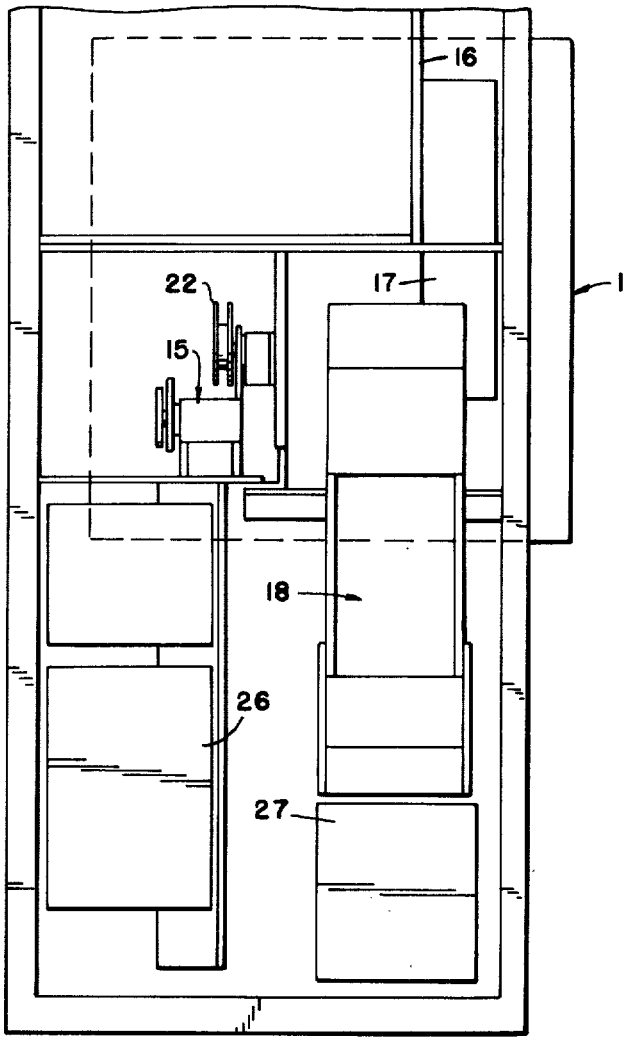
FIG. 4 illustrates a back elevational view, partly in section, of the apparatus depicted in the previous figures but also showing the safe which houses the supply of plastic packages of currency to be dispensed and the return box for the empty plastic packages.

The invention will now be described with reference to the exemplary embodiment illustrated in the accompanying drawings. The description first relates to one particular embodiment of the invention wherein the user, potential customer, or true security card holder may obtain currency or money from a bank at any hour of the day or night regardless of whether or not the bank is opened or closed and without the need of a human bank teller.

It should first be pointed out that the bank which provides the inventive cash dispensing apparatus issues a special article or security card to its customer. When the customer is issued the security card, he is also given a six digit secret number which is known only to the head office of the bank and that particular customer. The customer is required to memorize four digits of the six digit secret number which will hereinafter be referred to as the "PERSONAL NUMBER." It should be emphasized that the customer's personal number is not known by the employees of the various bank branches nor by the persons who may manufacture or service the cash dispensing apparatus.

With reference to FIG. 1, there is shown the front portion of the external fascia 1 of the cash dispensing apparatus as installed in the outer brick wall of a bank. The fascia 1 includes a card slot 2 wherein the potential customer may insert his security card when he desires to obtain currency. In addition to the security card slot 2, the fascia 1 includes a 10-key keyboard 3, a currency delivery slot 4, an empty currency package return slot 5, a "CARD RETAINED" sign 6, "TAKE CARD" sign 7, and "EMPTY" sign 8, an "ENTER NUMBERS" sign 9, an "AGAIN" sign 10, and a "WAIT" sign 11. Normally, the various designations of the signs 6, 7, 8, 9, 10 and 11 are not visible to the potential customer until an appropriate lamp is energized in back of a particular sign at the proper time in the sequence of operation of the cash dispensing apparatus.

After the potential customer has inserted his security card into the security card slot 2, there is a predetermined time delay during which the cash dispensing apparatus automatically determines whether or not the security card which has been inserted is a valid or invalid security card. Assuming that the potential customer has inserted a valid security card in the security card slot 2, the "WAIT" sign 11 is lighted while the cash dispensing apparatus is performing other automatic checking procedures to ultimately determine the validity or invalidity of the inserted security card. During the time when the "WAIT" sign 11 is lighted, the security card which has been inserted into the security card slot 2 is drawn into the apparatus so as to be out of reach of the potential customer and, accordingly, may not be withdrawn by the potential customer prematurely.

When the inserted security card has been determined to be a valid security card, the "WAIT" sign 11 returns to a non-illuminated condition, and thereupon the "ENTER NUMBERS" sign 9 becomes illuminated. This indicates to the potential customer that he is now required to enter or key in the four digits of his secret personal number which he has presumably committed to memory. The potential customer must thereupon key in the correct digits in their proper sequence, and he must do this within a predetermined interval of time. If the potential customer accomplishes this within the allotted time, this will indicate to the cash dispensing apparatus that he is indeed the true customer to whom the inserted security card has been issued by a bank.

After the potential customer has correctly entered his personal number digits in the correct sequence and allotted time, the "ENTER NUMBERS" sign 9 reverts to its non-illuminated condition, the inserted security card re-appears at the security card slot 2, and the "TAKE CARD" sign 7 becomes illuminated. This indicates to the potential customer that he should remove his security card from the security card slot 2, and upon doing so, a plastic package of currency will appear at the currency delivery slot 4. This particular sequence of operations is provided by the cash dispensing apparatus to avoid the situation of having the customer inadvertently leave his security card in the security card slot 2 after obtaining the desired currency. This sequence compels the customer to remove his security card from the security card slot 2 before any cash or currency will be dispensed to him.

The dispensed plastic package which contains the currency is illustrated in FIG. 9. The particular embodiment of the invention which is here described contemplates dispensing a predetermined amount of currency, for example, ten one-British pound sterling notes.

After the customer has removed the currency from the plastic dispensing package 12, he may place the empty package 12 in the plastic package return slot 5. This enables the bank to re-use the plastic package 12 over and over again for many dispensings of currency to many customers.

If for some reason the potential customer had failed to enter or key in the predetermined proper digits of the secret personal number, or had not done so in the proper sequence, or had failed to do so within the allotted time interval, then the cash dispensing apparatus would automatically give the potential customer a second opportunity to enter the correct personal number by using the 10-key keyboard 3 once more. This would be indicated to the potential customer by the simultaneous illumination of signs 9 and 10 designating "ENTER NUMBERS AGAIN."

If during this second opportunity the customer successfully and correctly enters his personal number using the keyboard 3, then the security card will reappear at security card slot 2, and the package of currency will be dispensed at currency delivery slot 4 in the same sequence as indicated above with reference to an initial successful entry of the personal number.

However, if the potential customer has failed to correctly enter his personal number during the second opportunity to do so, the signs 9 and 10 will revert to their non-illuminated condition, and thereupon the "CARD RETAINED" sign 6 will become illuminated. Should this occur, the security card which the potential customer has inserted into the slot 2 will not be returned to him, and the card dispensing apparatus will revert to its normal shut down condition after a predetermined interval of time, without dispensing any currency to the potential customer.

It should be pointed out that the "CARD RETAINED" sign 6 may become illuminated because of many other conditions, which will be described in detail hereinafter, which differ from the failure to enter the correct personal number.

The "EMPTY" sign 8 will become illuminated if the supply of packaged currency in the cash dispensing apparatus has become depleted.

For the convenience of the potential customers, the fascia 1 should be mounted so that the security card slot is between 32 inches and 56 inches above the pavement level.

With reference to FIG. 2 there is shown a side elevational view of a portion of the cash dispenser apparatus. FIG. 2 illustrates the external fascia 1, the security card transport mechanism 13, the pinch drive wheels 14, the security card reader 15, the currency safe 16, the currency dispensing chute 17, and the printer and paper stack 18.

Figure 5:
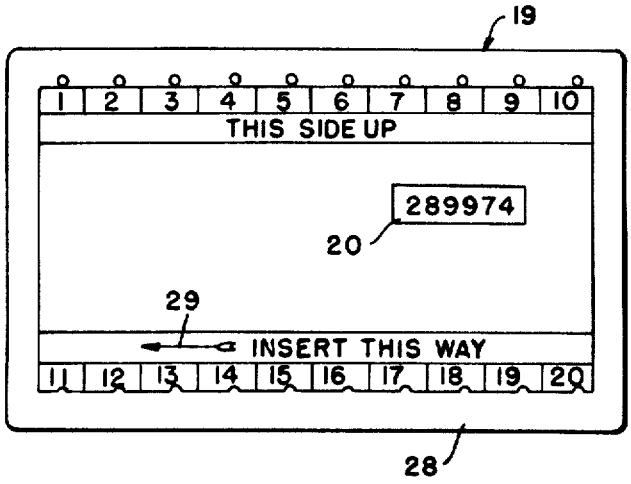
FIG. 5 illustrates a front view of a first embodiment of the novel article or security card which may be used with the cash dispenser apparatus.
Figure 6:
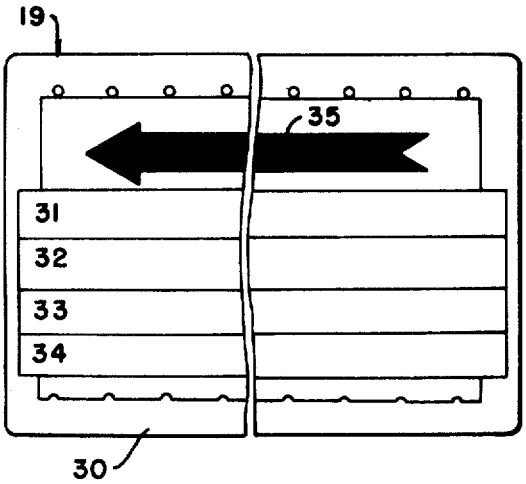
FIG. 6 illustrates a rear view of the article or security card shown in FIG. 5 depicting the large black arrow and the four magnetic recording stripes or tracks.

The security card transport mechanism 13 consists of a simple pinch wheel drive including pinch drive wheels 14 which pass the security card 19 (which is illustrated in FIGS. 5 and 6) under seven electromagnetic heads which check, read, erase and wire upon the security card 19. The security card 19 may be provided with a reference control or serial number 20 (see FIG. 5) on one side of the security card. The card reader section 15 may include a simple embossing printer to print or emboss this reference control or serial number from the security card 19 onto a paper strip, such as one-half inch wide Action paper. A back-up serial printer is provided in the cash dispensing apparatus as a double check should the main printer fail to record the complete details of a transaction when a currency dispensing occurs. When necessary, this back-up serial printer records the reference control or serial number of any security card 19 which results in a dispensing of currency. FIG. 2 shows the supply reel 21 and the takeup reel 22 for the paper strip of the back-up serial printer.

The card reader section 15 also is provided with a dimpler or punching device (not shown) to dimple or punch the security card 19 as an indication of the number of times the security card has been used.

With reference to FIGS. 2, 3, 4 and 7, there is shown the currency safe 16 which contains a cash dispensing mechanism 23 comprising four stacks of packaged currency. Dispensing occurs from right to left, as viewed in FIG. 7, and changes over automatically to the next stack when the stack to the right has been depleted. Under the proper conditions and operation of the apparatus, the plastic package 12 containing a predetermined amount of currency will be dispensed from the cash dispensing mechanism 23 down the cash dispensing chute 17 to the gated currency delivering slot 4. The gate (not shown) provided in the cash dispensing machine 17 is actuated to deliver the package 12 of currency to the customer only after the customer has removed his security card 19 from the security card slot 2.

The cash dispensing mechanism 23 automatically changes over from one stack to the next except when reloading of the mechanism 23 is performed, after which a dispenser recycle switch (not shown) must be operated to bring the rightmost (as viewed in FIG. 7) loaded stack into use. This dispenser recycle switch must also be operated whenever the door of the currency safe 16 has been opened, in case the cash dispensing mechanism 23 has been disturbed.

FIGS. 2, 3, 4 and 7 indicate generally the printer and paper stack 18. The printer and paper stack 18 includes a main printer (not shown) and a stack of paper bank vouchers 24, such as the voucher 24 illustrated in FIG. 10, upon which the main printer records the full details of all transactions of the apparatus regardless of whether a dispensing of currency has occurred or not. It has been found convenient in order to print or complete the voucher 24 to employ a main printer which comprises eight data print modules and four date print modules. These modules are combined counter and print modules, and are able to step forward one position for each applied count pulse. They embody a rotary switch which can be used for read-out or homing facilities.

Figure 3:
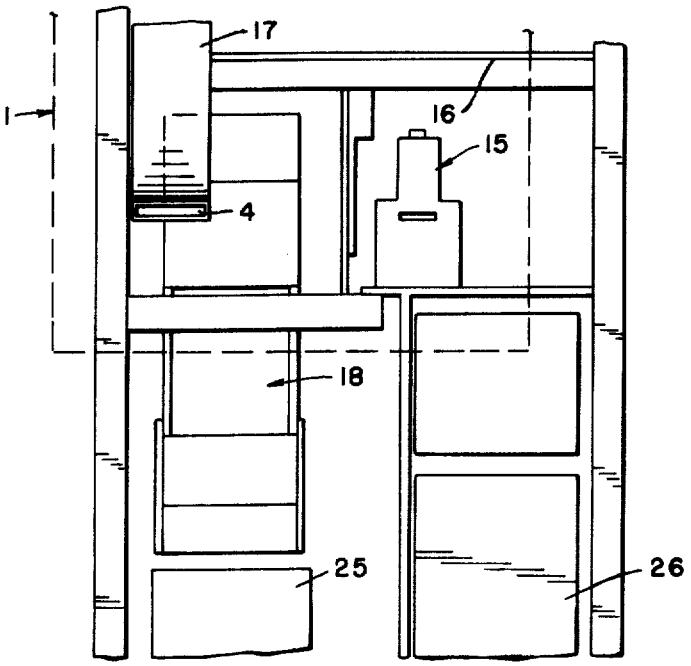
FIG. 3 illustrates a front elevational view, partly in section, of the apparatus shown in FIG. 2 wherein there is depicted the security card reader, the cash dispenser chute, the printer and paper stack, the power supply, the printed circuit boards, and the external fascia shown in phantom lines.

FIG. 3 shows a front sectional view of the apparatus which includes the power supply 25. The greater part of the electronic section of the apparatus is a printed circuit board section 26 as shown in FIG. 3. The printed circuit board section 26 contains approximately 32 logic and control printed circuit boards each of which contains approximately 25 to 30 integrated circuit gates. The logic and control aspects of the inventive cash dispensing apparatus are described in detail hereinafter with respect to FIGS. 11 through 16.

In FIG. 4 there is shown a back elevational view of the cash dispensing apparatus which includes a container 27 for the empty currency packages 12. It will be recalled that the customer removes his currency from the plastic package 12, and drops the empty package 12 down the return slot 5 which is connected by a chute to the container 27.

FIG. 5 illustrates the front surface 28 of the inventive article or security card 19 which may be used with the cash dispenser apparatus. Because it is vital to a successful operation of the cash dispenser apparatus that the security card 19 be inserted in the security card slot 2 with the proper surface of the security card 19 facing up and in the proper direction, the front surface 28 of the security card 19 is provided with designations such as "THIS SIDE UP" and the designation "INSERT THIS WAY" which is associated with a small directional arrow 29.

The front surface 28 of the security card 19 is also provided with an embossed reference serial or control number 20. As previously mentioned, this embossed number 20 is provided as an additional safety feature in the event of a malfunction of the main printer to record the full details of the transaction on the voucher 24. If desired, the front surface 28 may also be provided with the printed designation of the issuing bank and the name of the customer.

The front surface 28 may also be provided with predetermined areas which are numbered 1 through 20 and which are used to designate how many times the security card 19 has been used to obtain currency. Upon each use of the security card 19, the previously mentioned dimpler or punch mechanism dimples or punches a hole or perforation in one of the designated areas 1 through 20. This readily indicates to the customer the total number of times the card 19 has already been used. In this particular embodiment, the security card 19 is intended for a total of 20 usages whereupon the security card 19 is retained by the apparatus and the customer may be issued a second security card 19. Accordingly, on the 20th use of the card, the card is deemed to have been expired and is therefore retained by the apparatus and not returned to the customer. On such a 20th use of the security card 19, the voucher 24 (illustrated in FIG. 10) will include in the area for the retention code a printed "1," indicating that the security card 19 is being retained because the card is expired. This is one effective way for the issuing bank to make certain that there is no over use of the security card 19.

FIG. 6 illustrates the rear surface 30 of the security card 19 which shows the four magnetic recording tracks or stripes 31, 32, 33 and 34, respectively. The magnetic recording strips 31, 32, 33 and 34 contain predetermined static and dynamic information or data which is recorded using a very safe and sophisticated coding technique to prevent forgeries of security card 19.

To facilitate understanding of the static and dynamic information or data which is recorded on the magnetic recording stripes 31, 32, 33 and 34, it is convenient to assume that strips 31 and 32 include all the static data in which may be termed track No. 1 and track No. 2; and that stripes 33 and 34 include all the dynamic information or data in what may be termed track No. 3 and track No. 4.

Track No. 1 and track No. 2 may contain in coded form information such as an account number, a branch sort code number, a cross check character, a space code character, and a detected code character.

Track No. 3 and track No. 4 contain the dynamic information or data in coded or scrambled form which may include a check word, the personal number, various security card checks, a supplementary personal number, a date, the number of times the security card has been used and other data. The particular details of the static data recorded in track No. 1 and track No. 2 and the dynamic data recorded in track No. 3 and track No. 4 will become more apparent in connection with the description hereinafter of FIGS. 14, 15 and 16. The terminology static data or information as used herein refers generally to data which is constant and need not be updated or altered. The terminology dynamic data or information as used herein refers generally to data or information which is up-dated, or up-counted, or altered in some other fashion.

It should be noted that the rear side 30 of the security card 19 also includes a first predetermined area or large black arrow 35 which indicates the direction for correct insertion of the security card 19 into the security card slot 2 in the same manner as the small arrow 29 on the front surface 28 of the security card 19. However, the large black arrow 35 has a more sophisticated function or purpose than merely indicating the correct direction for inserting the security card 19. To the human eye the large black arrow 35 appears to be homogeneously black and constant in color or composition. However, the apparently homogeneous large black arrow 35 contains a random application of a random quantity of magnetic material which is not apparent to the casual human observer.

Only that random quantity of magnetic material in the large black arrow 35 which is positioned within a plurality of preselected rows or tracks, in the form of discrete magnetic spots, is of importance. The additional amount of magnetic material adds to the security of the system. Before the security card 19 is issued to a customer of the bank, these magnetic spots within the preselected tracks of arrow 35 are carefully counted. The counting operation is part of a verifying and limit computing process which is similar to the operation performed by the card reader 15 in the cash dispensing apparatus. To facilitate the counting of the discrete magnetic spots, an electromagnetic field of a predetermined frequency produced by an oscillator is applied to the predetermined tracks of the arrow 35. The arrow 35 which is thus energized by the oscillator field is then read to determine the number of energized magnetic spots in the arrow 35. This "number" is subjected to a mathematical transformation to arrive at two related "limits." These limits, which may have any desired mathematical relation to the actual number of spots, are included, in coded form, in magnetic stripes 33 or 34, (track No. 3 or track No. 4) as the so-called security check limits.

As a simplified example, assume that the mathematical transformations are 1.1N and 0.95N were N represents the number of spots. Then, if N = 300 for a particular card, the limits would be 330 and 285 and obviously the relationship between N and the limits is that N must fall between the limits. In practice the bank may select virtually any mathematical transformation to derive the limits and require virtually any mathematical relationship between the number and the limits.

One of the several checks performed by the cash dispensing apparatus to determine the validity or invalidity of the inserted security card 19 is an energization of the preselected rows or tracks of the large black arrow 35, a reading of the thus energized tracks, and a comparison of the read value with the security check limits which have been encoded on magnetic stripes 33 or 34. In other words, when the security card 19 is actually inserted in the cash dispensing apparatus during a dispensing transaction, the inserted security card 19 will be determined to be invalid if the value read from the energized black arrow 35 is not properly mathematically related to the secured check limits which have been encoded in scrambled or coded form on magnetic stripes 33 or 34.

In addition to the 20-use limitation on each security card 19, there is another limitation to prevent over-use of the security card 19. During each disposing operation with a particular security card 19, the date of the dispensing transaction is encoded on magnetic stripe 33 or 34. This date is up-dated at each dispensing operation or use of the security card 19. At each insertion of the security card 19 into the cash dispensing apparatus the date which is encoded on the card is compared with the actual date stored in the electronics of the cash dispensing apparatus. If the comparison of the dates reveals that the date encoded on the security card 19 is the same date as stored in the electronic apparatus, then no currency will be dispensed to the potential customer and, in addition, the inserted security card 19 will be retained by the apparatus. Consequently, each security card 19 cannot be used more than once during the same day, nor more than 20 times in total.

Figure 7:
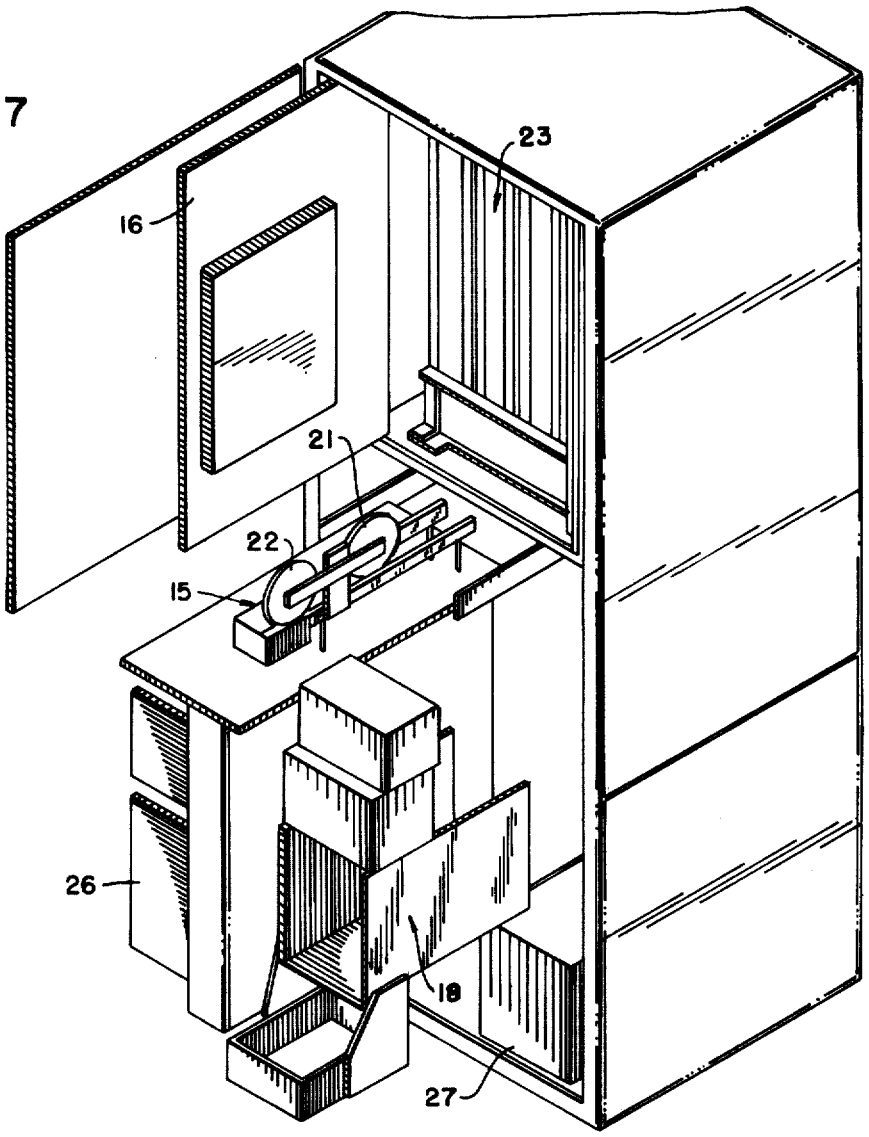
FIG. 7 illustrates a perspective view of the embodiment of the cash dispensing apparatus shown in FIGS. 1 through 4 with the door of the safe opened and the other various components of the apparatus slid rearward for clarity and easy access.

With reference to FIG. 7, there is shown a perspective view of the cash dispensing apparatus from the rear showing the various components slid rearwardly for easy servicing and access. The door of the currency safe 16 is shown in an open position to illustrate the four stacks of the dispensing mechanism. The entire cash dispensing apparatus in an actual embodiment has dimensions of 6 by 2 by 3 feet.

FIG. 8 illustrates a perspective view of the cash dispensing apparatus as installed in the external brick wall of a bank. This installation arrangement makes the cash dispensing apparatus virtually vandal proof and minimizes exposure of essential components of the apparatus to the elements. In an actual operating embodiment of the cash dispensing apparatus, it has been found advantageous to fabricate the external fascia 1 from stainless steel. If desired, the 10-key keyboard may be arranged at a 30° slanting angle relative to the remaining portions of the external fascia 1.

With reference to FIG. 9, there is shown a preferred embodiment of the plastic package or clip 12 which is used for dispensing the currency. The plastic package 12 is provided with a thumb hole 36. With reference to FIGS. 7 and 9, the plastic packages 12 holding the predetermined amount of currency for dispensing are loaded into the four stacks of the dispensing mechanism 23 by first placing the machine inhibit switch (not shown) in a down position to prevent potential customers from operating the machine during currency reloading and then loading the plastic packages 12 so that the open end faces to the left and the thumb hole 36 is at the bottom.

As shown in FIG. 10, there is printed on the bank voucher 24 a size digit sorting code which is sometimes referred to throughout the specification as a branch sort code, and an eight digit account number. Both the branch sort code and the account number are part of the static information or data and are printed by the aforementioned eight data print module of the main printer.

Should a security card be retained by the apparatus for any reason, the eight data modules of the main printer will print a retention code which indicates the reason for the retention. The first possible retention code is a printed "1" which means that the security card which has been inserted into the cash dispensing apparatus is an expired card; or in other words, that this is the twentieth use of the inserted security card. The second possible retention code is a printed "2" which means that the personal number has been entered or keyed in incorrectly upon two opportunities to do so. The third possible retention code is a printed "3" which means that the security card 19 which has been inserted into the cash dispensing apparatus was already inserted in the apparatus for a currency dispensing earlier on that same day. The fourth possible retention code is a printed "4" which means that the value obtained by reading the energized large black arrow 35 on the security card 19 which has been inserted into the apparatus is mathematically incorrect relative to the values encoded in scrambled form on magnetic stripe 33 or 34 as part of the dynamic information or data.

The fifth possible retention code is a printed "5" which indicates an abnormal condition in the parity check. The sixth possible retention code is a printed "6" indicating an abnormal condition in the cross check. The seventh possible retention code is a printed "7" which indicates an abnormal condition in the code check. The reasons for the fifth, sixth and seventh retention codes will become more apparent in connection with the figures following FIG. 10 and the further description hereinafter.

The eight data modules of the main printer also prints the number of times the inserted security card has been used, which as indicated above, cannot exceed 20 uses. The eight data modules of the main printer will also print out the predetermined amount of dispensed currency, which in the case of the voucher 24 illustrated in FIG. 10 is 10 British pounds.

The aforementioned four date print modules of the main printer automatically prints the dispense date on the voucher 24. The illustrated dispense date indicates the mouth and day and omits any designation of the year.

As a variation in the printing arrangement for the dispense date, the four date print modules of the main printer can be used to include the least significant digit of the year too. In such an arrangement, two zero to nine 10-position modules are employed for the unit days and 10's of days, and are connected so that a single day impulse will step the count from one through to 31. A one- to 12-position module is utilized for the months, and a further zero to nine position module is utilized for the least significant digit of the year.

In the field cryptography is must be appreciated that there are many methods of encoding a message which depend on the degree of security necessary. In one relatively simple system each letter in the message is replaced by a different letter to form a coded message; a constant linear relationship applies between each letter in the normal text and each letter in the coded text. Thus all occurrences of a particular letter in the message are encoded in the same fashion in the encoded text. This may be referred to as a monoalphabetic substitution. A more sophisticated type of coding scheme uses a polyalphabetic substitution wherein a different alphabet may be used to encode each letter of the text. Thus all occurrences of a particular letter are usually encoded differently.

In addition to encoding each letter from the text to obtain the coded message, the arrangement of the letters in the coded message may be rearranged. Again, any desired degree of sophistication may be used in the rearrangement technique and, in a given system, several techniques may be used simultaneously as long as each message has some indication of which technique is being used. Therefore, by way of example only, if the fifth character in the encoded message is not a message of text but refers solely to the method of encryption, (coding and/or arrangement) then for the English alphabet 26 methods of encryption may be used simultaneously.

Since the particular encryption method is not critical for a complete understanding of the operation of the present system and apparatus, terminology such as scrambler, decoder, or distributor will be used and should be construed to include all the necessary electronic logic required to perform the encryption or decoding functions. For example, the decoder and distributor or demultiplexer will include the logic for translating the information from coded text to plain text and also will include the logic necessary to feed the information in appropriate fashion into a storage register. Thus the arrangement of the data as well as the encryption technique are immaterial as long as the logic of the decoder and distributor satisfactorily provides the output to the necessary portions of any storage means or register.

Figure 11:
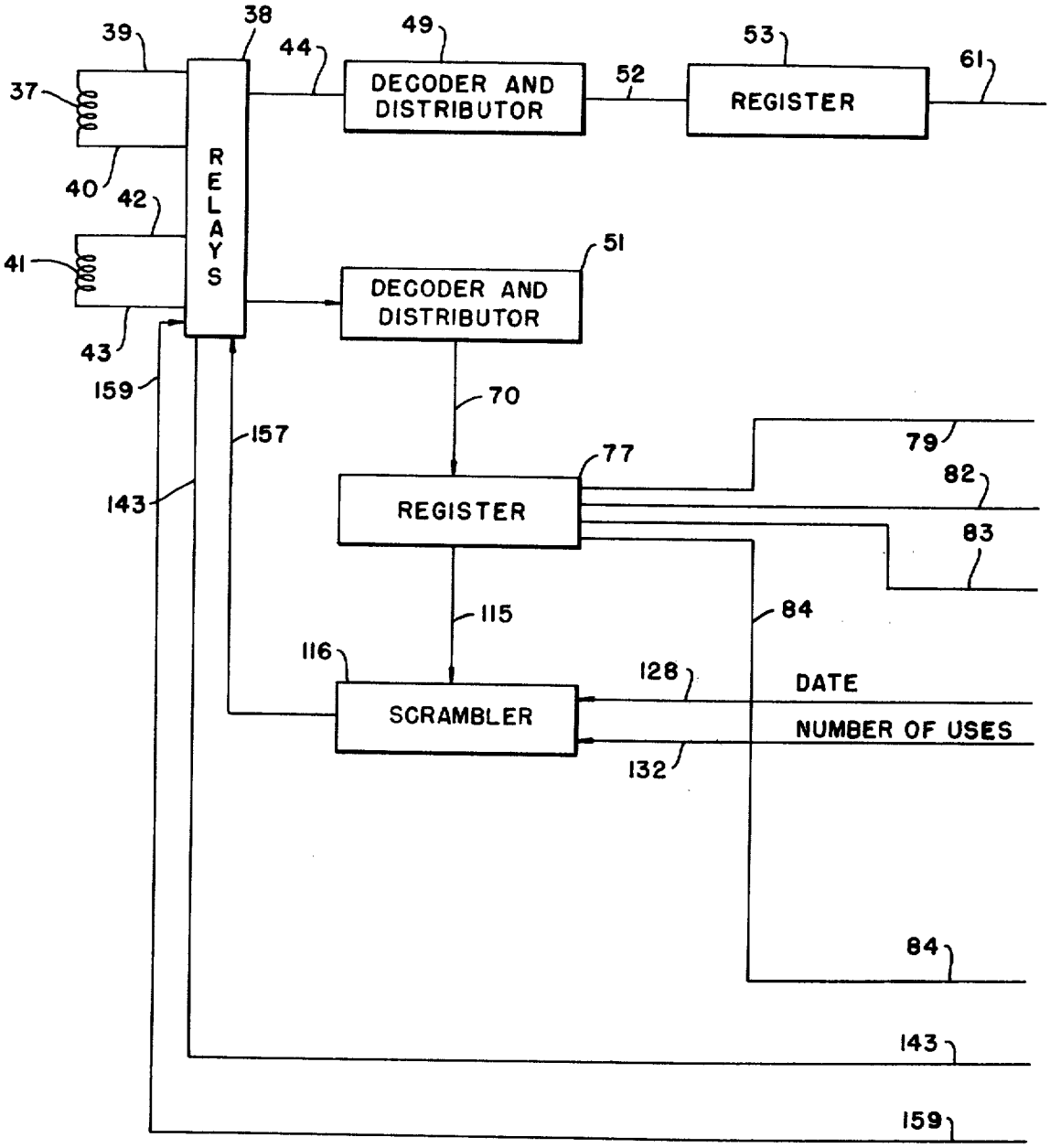
FIGS. 11, 12 and 13 form a composite overall information block diagram for the entire cash dispensing apparatus or system.
Figure 12:
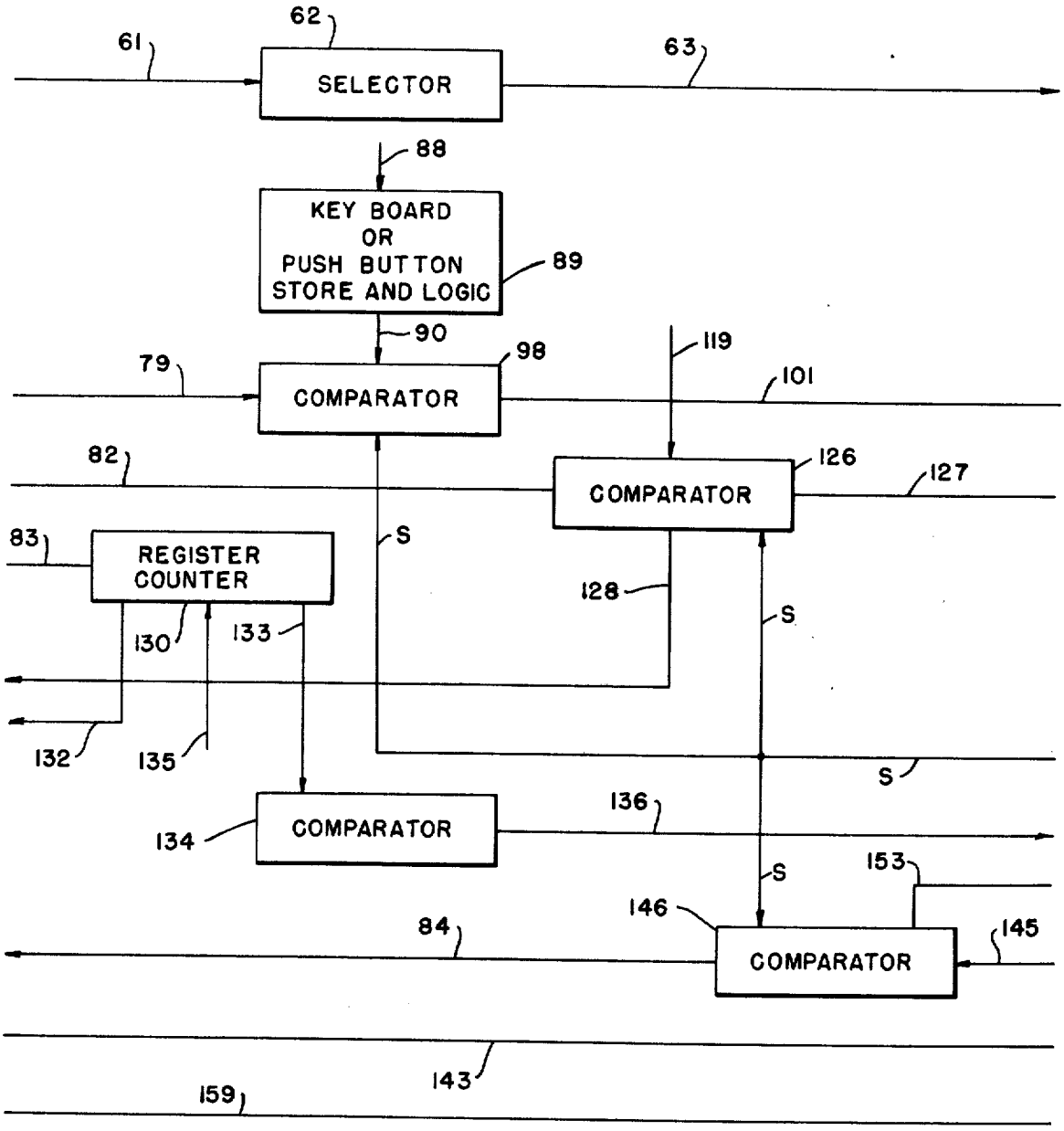
Figure 13:
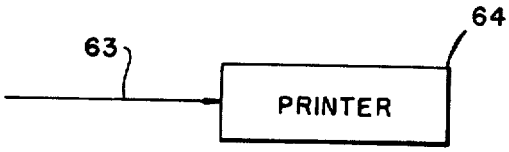
Figure 13:
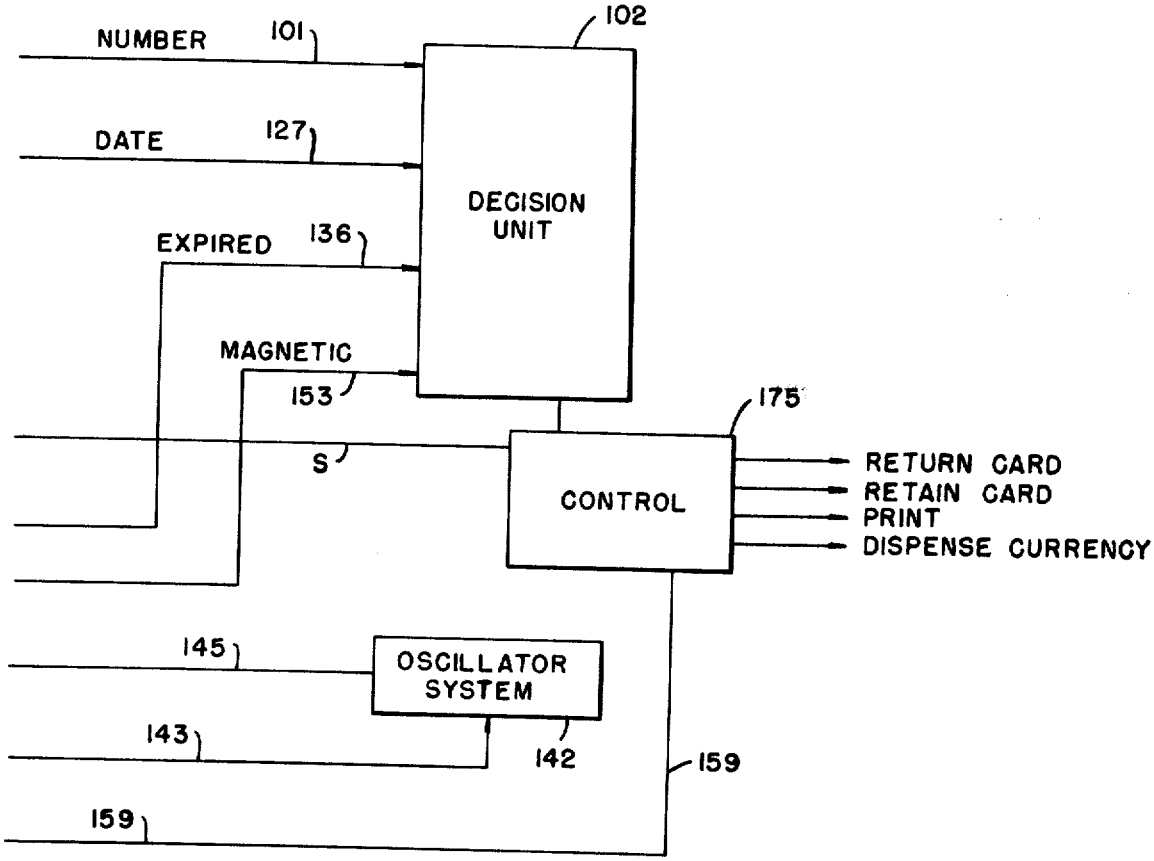

FIGS. 11, 12 and 13 illustrate a composite overall information block diagram for the entire cash dispensing apparatus or system. With reference to FIG. 11, there is illustrated a read head 37 which is connected to relays 38 by electrical conductors 39 and 40. There is also a read head 41 which is connected to the relays 38 by electrical conductors 42 and 43. The static information which was encoded on track No. 1 and track No. 2 on the security card 19 is read by the rear head 37. The dynamic data encoded on track No. 3 and track No. 4 of the security card 19 is read by the read head 41.

The output of relays 38 is connected along line 44 to a decoder and distributor or demultiplexer 49. Decoder and distributor 49 performs the function of decoding (demultiplexing) the scrambled information read by the read head 37 and, in addition, through the necessary logic and gating providing an output on line 52 to the storage register 53. By way of illustration, register 53 may be a 16 by 6 register and is more fully described with reference to FIG. 14. Since the statis is stored in register 53, register 53 is often referred to as a static store. The output of the static register 53 is connected by the line 61 to a selector 62 (FIG. 12) which, in turn, is connected via line 63 to the main printer 64 (FIG. 13). The main printer 64 is the same main printer which was mentioned earlier in the description and which comprises the eight data print modules and the four date print modules which were utilized for printing various information on the bank voucher 24 which is illustrated in FIG. 10. (The back-up printer is not shown in FIG. 13).

With reference back to FIG. 11, the output of the relays 38 is also connected on line 50 to the decoder and distributor or demultiplexer 51. The output of the decoder and distributor 51 is connected on line 70 to a storage register 77, often referred to as a dynamic store. The output of register 77 along line 115 goes to a scrambler or encoder 116. The input to register 77 on line 70 is determined by the internal logic of the decoder and distributor 51. The register 77 is more fully described with reference to FIG. 15.

With reference to FIGS. 11 and 12, a line 79 feeds the output of register 77 to one input of a two input comparator 98. When the personal number information is entered by means of the pushbutton or keyboard 3, the signal appears on information line 88 and is conveyed to keyboard or pushbutton storage and logic 89. Keyboard logic 89 converts the signal to the same logical form which is being used in register 77 and the keyboard logic output on line 90 goes as the other input to the two input comparator 98. When the comparator 98 is strobed or sampled by a pulse on line S an appropriate signal appears on line 101 indicating to the decision unit 102 (FIG. 13) whether or not the information on the card and keyboard agree.

With reference to FIGS. 11 and 12, another output from register 77 is connected on line 82 to one input of a comparator 126. The date, which is generated internally, is provided on date information input 119 and fed to the other input of comparator 126. When comparator 126 is sampled, by a pulse on line S the present date is compared to the date of the last transaction. The result of this comparison is sent on line 127 to the decision unit 102 and, since this must be changed on the security card 19, the present date is also sent on line 128 to scrambler 116.

As indicated previously, each card may only be used a predetermined number of times. To ascertain the number of past uses, another output from register 77 is provided on line 83 to a register or counter 130. Register 130 has two outputs one of which is connected to scrambler 116, on line 132, and the other of which is connected on line 133 to a comparator 134. The comparator 134 operates to make certain that an "expired" signal is sent out after the predetermined number of uses of the security card. The cash dispensing apparatus provides a counter increment signal on line 135 leading to the counter 130 to make sure that the current use of the security card 19 is added to the total number of uses for the inserted card. Normally, the output of the counter 130 is conveyed via output line 132 to the scrambler 116. However, if the current use of the inserted security card 19 is the 20th use, the comparator 134 generates and transmits an "expired" signal on line 136 which is conveyed to the decision unit 102 in FIG. 13.

With reference to FIG. 13 there is illustrated an oscillator system 142 which cooperates with the relays 38 via line 143 to evaluate the randonly applied random quantity of magnetic material which is within the predetermined tracks or areas on the large black arrow 35 as discussed with the explanation of FIG. 6. The output of oscillator system 142 is transmitted via line 145 as one input to the magnetic material comparator 146.

Referring back to FIGS. 11 and 12 another output from register 77 on line 84 is connected to the magnetic material comparator 146. This information is also conveyed to the scrambler 116 on line 152. The limit values, which have been encoded in scrambled form on the inserted security card 19, are decoded by the decoder 51. In this case the decoding operation also serves to decode the precise mathematical relationship desired and converts the information into a workable binary form to be transmitted on line 84 to the comparator 146. Since the other input to comparator 146 is the actual reading taken from the large black arrow 35 at the time the card is inserted, the output when comparator 146 is sampled indicates whether or not the appropriate mathematical relationship has been satisfied. The output of comparator 146 is connected on line 153 to the decision unit 102 in FIG. 13.

Thus the information presented to the decision unit 102 includes a check of the personal identification number, the number of uses, the date of the last use and the amount of magnetic material. Furthermore, some of this information is set to the scrambler 116 on lines 128 and 132. The output of the scrambler is connected on line 157 back to the relays 38. In this fashion, the information can be scrambled and re-recorded on the security card 19. To permit re-recording the read heads 37 and 41 may also be used as write heads. For this reason the relays 38 include a control intput 159 to select the appropriate read or write mode of operation.

Figure 14:
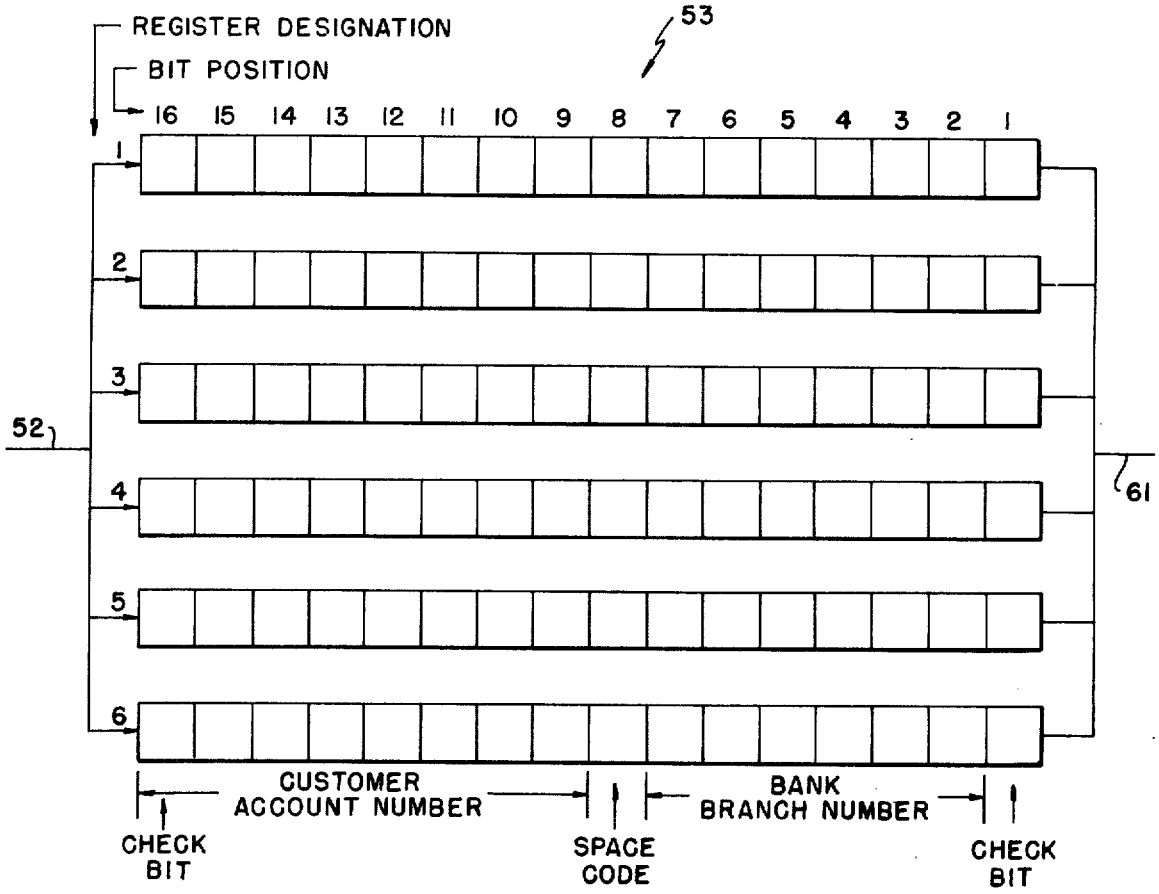
FIG. 14 illustrates the storage for the two tracks or stripes of static data which is recorded on the rear side of the security card.
Figure 15:
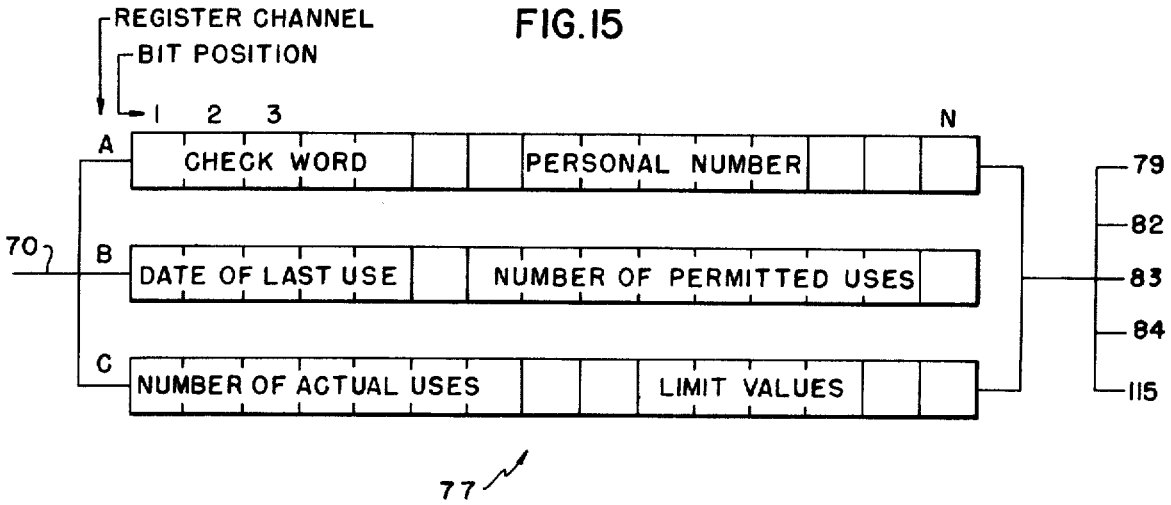
FIG. 15 illustrates the storage for the two tracks of dynamic data which is recorded on the rear side of the security card.

To facilitate a more complete understanding of the operation and functioning of the composite information block diagram of FIGS. 11, 12, and 13 it is best to first consider and describe FIGS. 14, 15, and 16. Where applicable, the same reference numerals are used throughout the figures to designate similar or identical components.

Referring to FIG. 14, there is shown the storage register 53 which stores the static data from tracks 1 and 2. Once the data is decoded the distribution portion of decoder 49 provides, through the appropriate logic gates, the output along line 52 into the register 53. For the purpose of illustration the storage register 53 is considered to be a 6 by 16 register. Thus, once the data is decoded or unscrambled and demultiplexed (distributed), the data appears as 16 characters, each comprised of six binary information bits. Again, the particular order of the information on the security card and the particular order of entering the information into the register 53 is not critical to a proper understanding of the principle of this system. Suffice it to say that the distribution function is performed to put the data in a workable form such as that illustrated in FIG. 14.

Once the data has been loaded into register 53 it may be considered as including a check bit, to insure the data has been loaded properly, a six digit number representing the bank branch or any other desired sorting code as mentioned in connection with the printed voucher 24 illustrated in FIG. 10, and a space code, that is, the binary configuration of a blank space. In addition, register 53 also includes an eight character number representing the customer's account. One of the numbers in the customers account, shown by way of example as bit 16, may be used as a check bit. This check bit may also be referred to as a code check character which was previously mentioned in connection with the seven possible retention codes wherein the security card 19 would not be returned to the customer and wherein a printed numeral indicating an abnormal code condition in the code check was printed on the bank voucher 24. As also illustrated in FIG. 14 the output of register 53 is selectively taken along lead 61 to a selector 62. This is to permit desired information to be printed as indicated previously with the discussion of the bank voucher 24 in FIG. 10.

Referring next to FIG. 15 the register 77 will be explained. The scrambled and encoded information which is on tracks 3 and 4 is decoded and demultiplexed by the decoder 51 to provide information on line 70 to the appropriate portions of the register 77. Register 77, by way of example, may be a three channel register having a sufficient number of bit positions. Ultimately, the information from register 77 is transmitted by output line 115 to the scrambler 116 to be re-recorded on the security card 19.

FIG. 15 shows, in a representative form, a possible arrangement of dynamic data in register 77. In addition to the data illustrated in FIG. 15 other data such as check bits and parity bits can be employed as desired. By way of example, channel A may include a checkword and the personal number of the user, channel B can include the date of the last use and the number of uses permitted on this particular card, and channel C may include the number of actual uses and the limit values for the mathematical relationship of the comparison of the amount of magnetic material. The output lines 79, 82, 83 and 84 illustrate that information from portions of the register 77 is used as inputs to the various comparators of the system.

Referring again to FIG. 13 there is shown a control unit 175. Control unit 175 operates to provide sample or strobe pulses "S" to the comparators, controls the printing of information by printer 64, and controls the selection of the read or write mode of the magnetic heads 37 and 41 (on line 159). The control unit receives a signal on line 168 from decision unit 102 indicating the validity of the security card 19 and the validity of the information supplied by the user. The control unit also controls dispensing of currency, and the retention of the security card when it has expired or when incorrect information appears on the card or is supplied by the user. While most of the connections from control unit 175 has been omitted, for clarity, they are explained with reference to FIG. 16. Control unit 175 operates as various microswitches are actuated as will be explained with reference to FIG. 16.

FIG. 16 mentioned earlier comprises a composite control unit flow diagram for the entire currency dispensing apparatus consisting of FIGS. 16A, 16B, 16C and 16D. In this particular embodiment of the currency dispensing apparatus a microswitch must operate after each operation. The symbol $\mu S$ is used in the various parts of FIG. 16 to represent a microswitch.

Figure 16A:
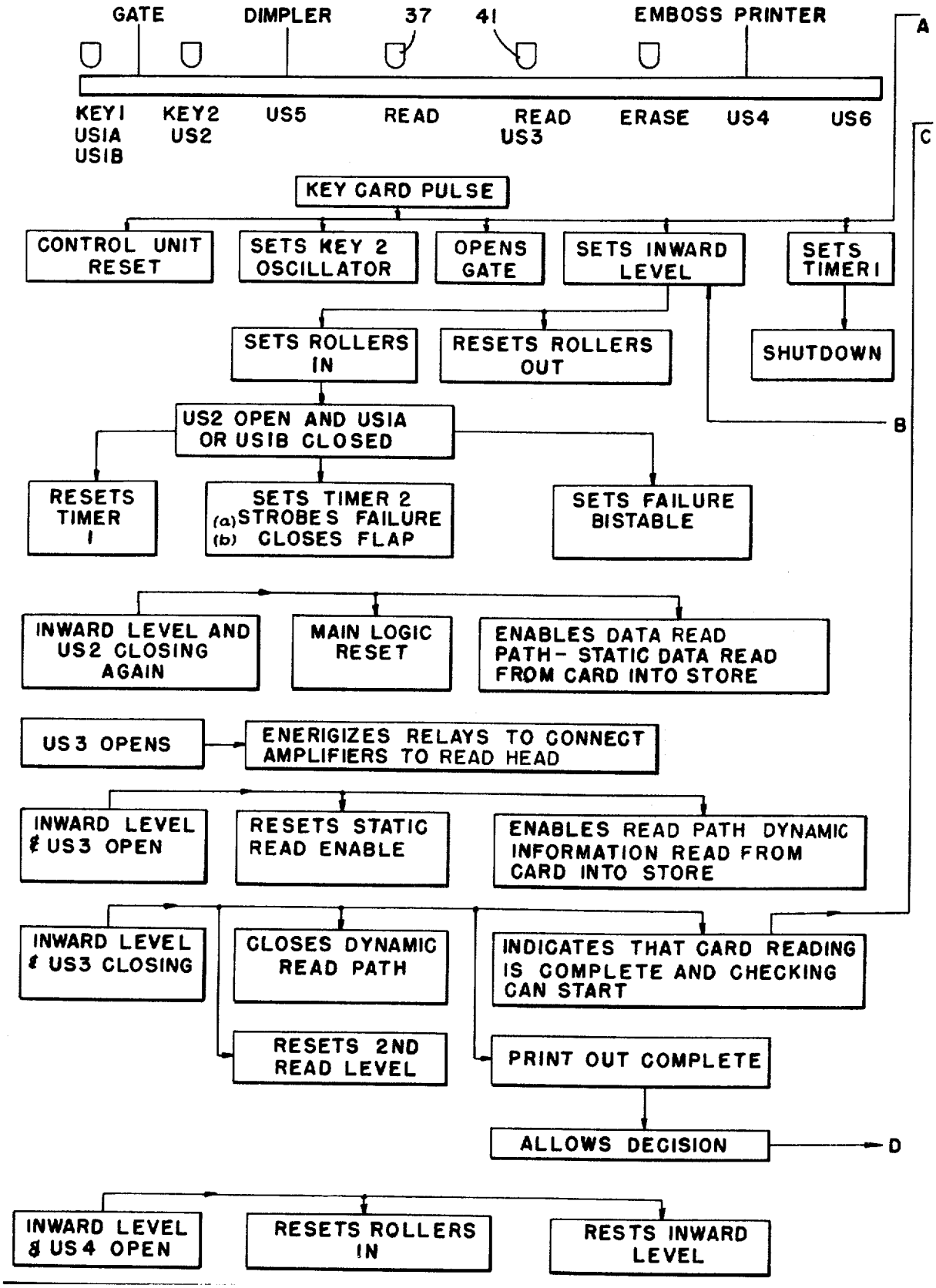
FIGS. 16A to 16D illustrate a control unit flow diagram for the overall cash dispensing system or apparatus.

The upper portion of FIG. 16A shows a representative illustration of the card reader section 15, the card transport mechanism 13, some of the microswitches, and the various magnetic head positions. The security card 19 is assumed to enter the card transport mechanism 13 on the left as viewed in the upper portion of FIG. 16A. The currency dispensing machine is normally in a shut down position. When the potential customer inserts the security card 19 into the card slot 2, the security card is stopped at the position marked "gate" near the lefthand portion of the upper part of FIG. 16A. Assuming that the KEY 1 magnetic head detects magnetic oxide in the area containing magnetic stripes 31, 32, 33 and 34 (see FIG. 6), and the inserted card possesses the proper dimensions, then the microswitches $\mu S1A$ and $\mu S1B$ will operate to give a key card pulse. The sign 11 designated "WAIT" is illuminated between a shut down condition of the machine and the key card pulse when no other sign is illuminated.

Figure 16B:
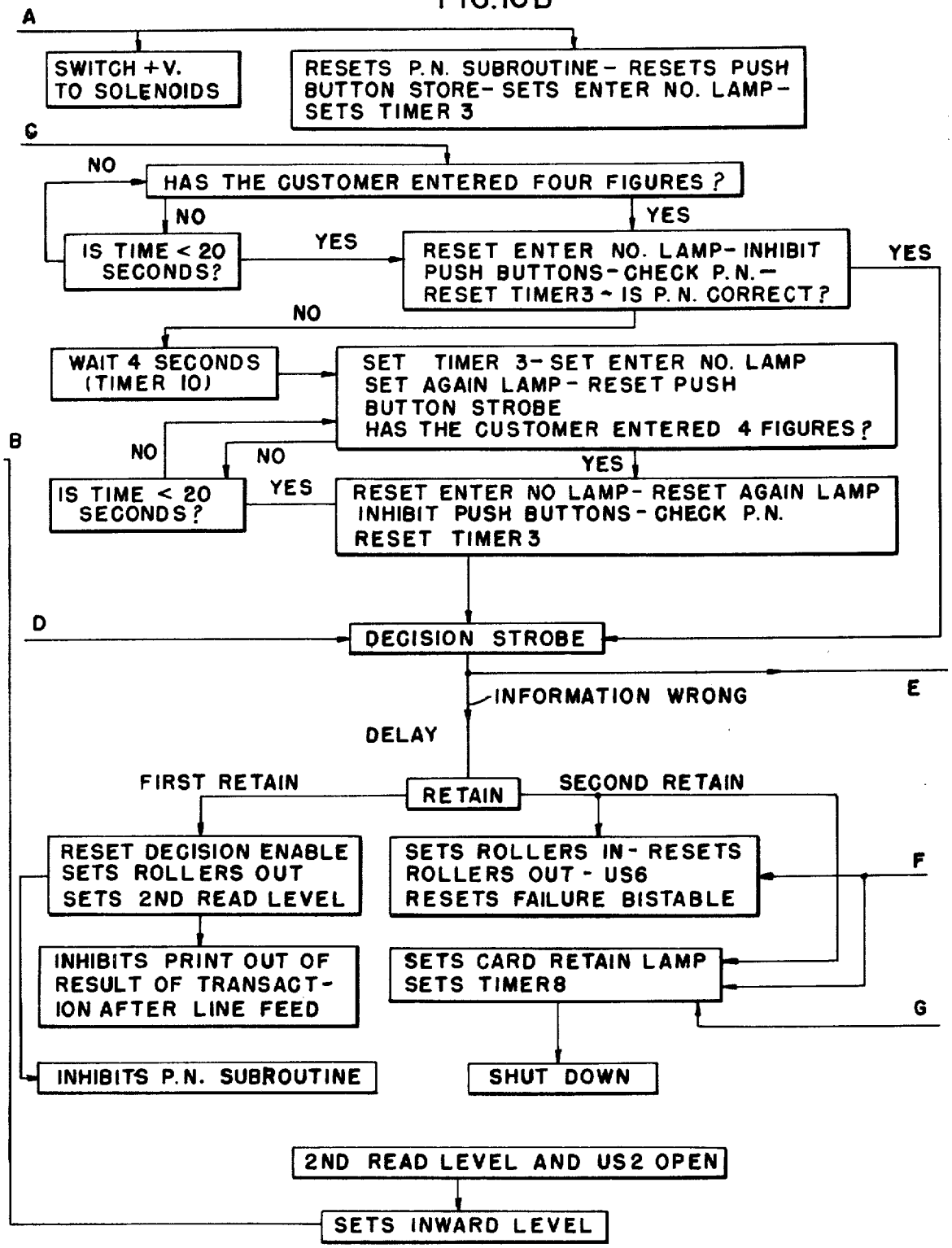

As indicated in FIG. 16A and 16B, the appearance of the key card pulse initiates several components and functions in the apparatus including the resetting of the control unit 175 (FIG. 13). the setting of the KEY 2 oscillator, the opening of the gate shown in the lefthand portion of the upper part of FIG. 16A, the setting of the inward level, the setting of a 20 second Timer 1, the switching of the positive voltage to the solenoids, and the resetting of the personal number subroutine. Although it is not indicated in FIGS. 16A or 16B, the appearance of the key card pulse also resets the main logic of the apparatus.

The setting of the inward level sets the rollers in and resets the rollers out of the card transport mechanism 13. The rollers referred to are the rollers 14 which are illustrated in FIG. 2.

With the setting of the inward level and the consequent setting of the rollers in, and with microswitch $\mu$S2 open and microswitch $\mu$S1A or $\mu$S1B closed, this indicates that a security card 19 is in the machine. This condition results in a resetting of Timer 1, a setting of Timer 2 with its attendant strobing of a failure bistable, the closing of the flap, and a setting of the failure bistable which is used to check the exiting of the security card 19 from the machine.

With the inward level set, as the security card 19 passes the microswitch $\mu$S2, the microswitch $\mu$S2 closes again and this results in a resetting of the main logic and the enabling of the static information or data read path. In other words, the read head 37 (also shown in FIG. 11) is enabled to read the static data which is encoded in magnetic stripes 31 and 32 (FIG. 6) into the decoder and distributor 49 and the register 53 as illustrated in FIG. 11 and set out in greater detail in FIG. 14.

As the security card 19 progresses or moves along from left to right as shown in the upper portion of FIG. 16A, it encounters and opens the microswitch $\mu$S3. This results in the energizing of the relays 38 (shown in FIG. 11) to permit reading of dynamic data by the read head 41.

With the inward level set and the microswitch $\mu$S3 open, the dynamic information or data read path is enabled, and the read static data enable condition is reset. At this point in time the dynamic data is read from magnetic stripes 33 and 34 (FIG. 6) into the decoder 51 and register or store 70 (FIGS. 11 and 15).

As mentioned hereinabove, the appearance of the key card pulse resets the personal number subroutine. At the same time, the keyboard or push button store and logic 89 (FIG. 12) is reset, the sign 9 (FIG. 1) designated "ENTER NUMBERS" is set, and a Timer 3 having a twenty second duration is set.

Returning now to the security card 19 as it moves from left to right as shown in the upper portion of FIG. 16A, as the card moves along with the inward level set the microswitch $\mu$S3 closes and this results in a closing of the dynamic read path, an indication that the card reading is complete and checking can now commence, a resetting of the second read level to remove the clamp on the main printer 64 (FIG. 13) for printing the results of the transaction, and a starting of the print out of the static data from the store or register 53.

As mentioned above, the closing of the microswitch $\mu$S3 gives an indication that the card reading is complete and that checking can commence. The nature of this checking can be understood by following the line C leading from FIG. 16A to the line C in FIG. 16B. With reference to FIG. 16B, the initial part of this checking is addressed to the question of whether or not the customer has entered the four correct figures or digits of the secret personal number. First, the apparatus determines whether the customer has entered the personal number within the alloted time which is determined by the above-mentioned Timer 3 having a duration of 20 seconds. If the customer has entered the personal number in a time duration of less than 20 seconds, then the sign 9 (FIG. 1) designated "ENTER NUMBERS" is reset, the push buttons or keyboard 3 is inhibited from further use, Timer 3 is reset, and the personal number is checked for correctness.

If the check reveals that the personal number entered by the customer is correct, then the decision strobe or sample is initiated by control unit 175 (FIG. 13).

If the check of the personal number indicates that the incorrect personal number has been entered via the keyboard 3, then there is initiated a four second time delay by a Timer 10. This four second time delay permits the resetting of the Timer 3 to be completed, the setting or illuminating of the signs 9 and 10 designated "ENTER NUMBERS AGAIN," and the resetting of the keyboard or push button store and logic 89 (FIG. 12). At this point, and as shown in FIG. 16B, the apparatus then goes through a similar checking operation as indicated earlier to ascertain whether or not the customer has entered the four figures or digits of the memorized personal number correctly. If it is revealed that the personal number has been entered correctly, this will also initiate the earlier mentioned decision strobe.

As mentioned earlier there has been commenced a print out of the static data from the register 53. Upon completion of this print out a decision is allowed to be made by the apparatus and this is indicated by the line D shown in FIGS. 16A and 16B leading to the decision strobe.

Before describing what occurs at the decision unit 102, let us reconsider what is transpiring with the movement of the security card relative to the upper portion of FIG. 16A. As the card reaches microswitch $\mu$S4 with the inward level set, the microswitch $\mu$S4 opens and this results in the resetting of the inward level and the resetting of the rollers in with the consequent halting of the security card.

Figure 16C:
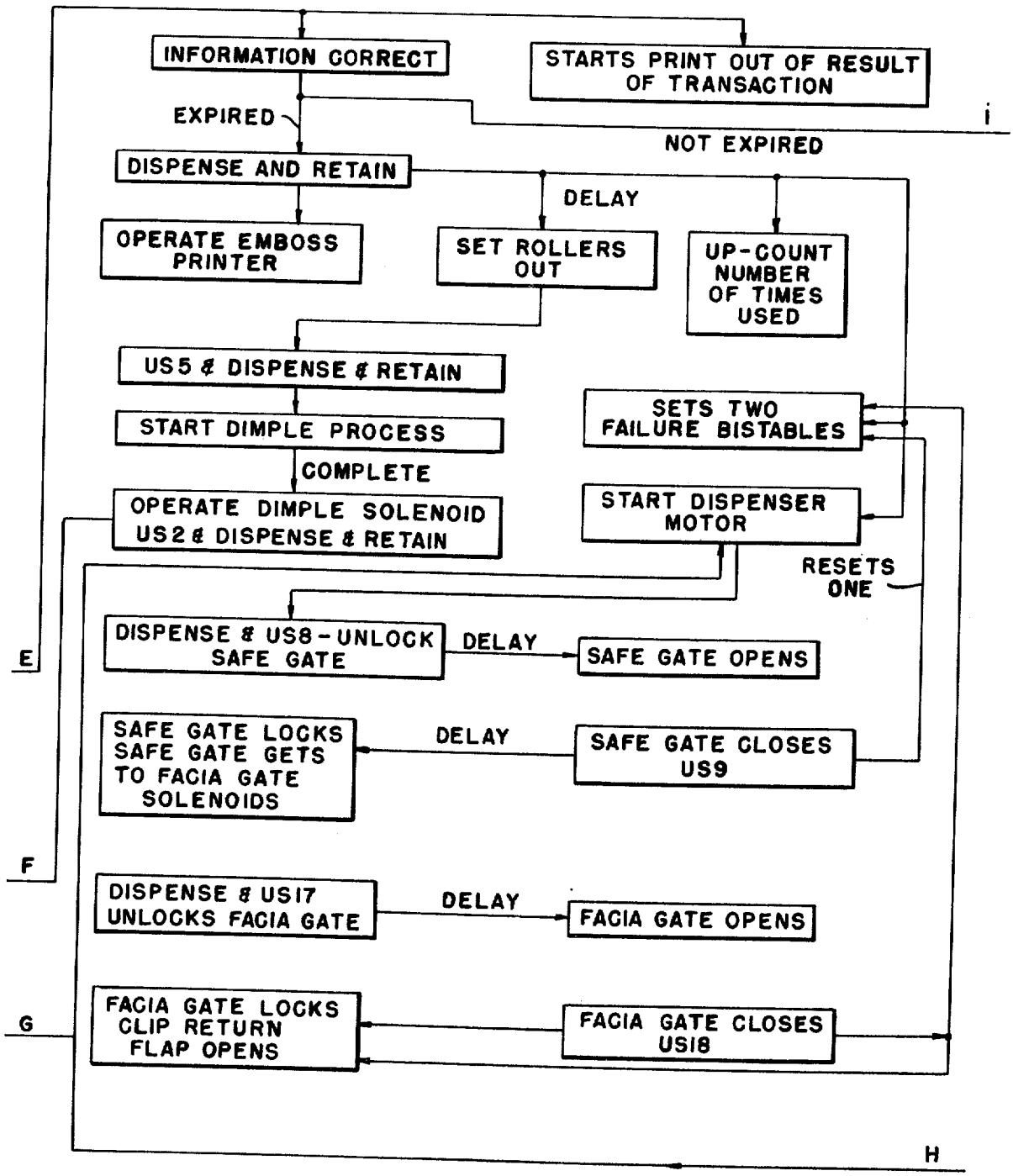

With reference to FIGS. 16B and 16C, it is noted that there is a line designated E emanating from the decision strobe which indicates the start of the printing of the results of the transaction and also indicates that the static and dynamic information and the entered personal number are all correct. It is now necessary for the apparatus to determine whether the inserted security card is expired, i.e., whether or not this is the twentieth use of the card. If the card is determined not to be expired, then this initiates a dispense and return signal (see FIG. 16D). This signal results in the operation of the emboss printer, a setting of the erase magnetic head, a setting of the re-record relays within the unit designated relays 38 in FIG. 11 to an "on" condition, an upcounting operation initiated by the upcount or increment signal fed into the counter 134 via line 135 (FIGS. 11 and 12), a new setting of the re-record circuits, and the initiation of a time delay before the rollers are initiated to send the security card 19 from right to left as shown in the upper portion of FIG. 16A in order to return the card to the customer. The erase magnetic head which is indicated in the upper portion of FIG. 16A is actually a large magnetic head which erases the magnetic stripes 33 and 34 which carry the dynamic data. The re-record relays and associated circuitry and magnetic heads re-record the dynamic data which has been updated onto magnetic stripes 33 and 34.

Figure 16D:
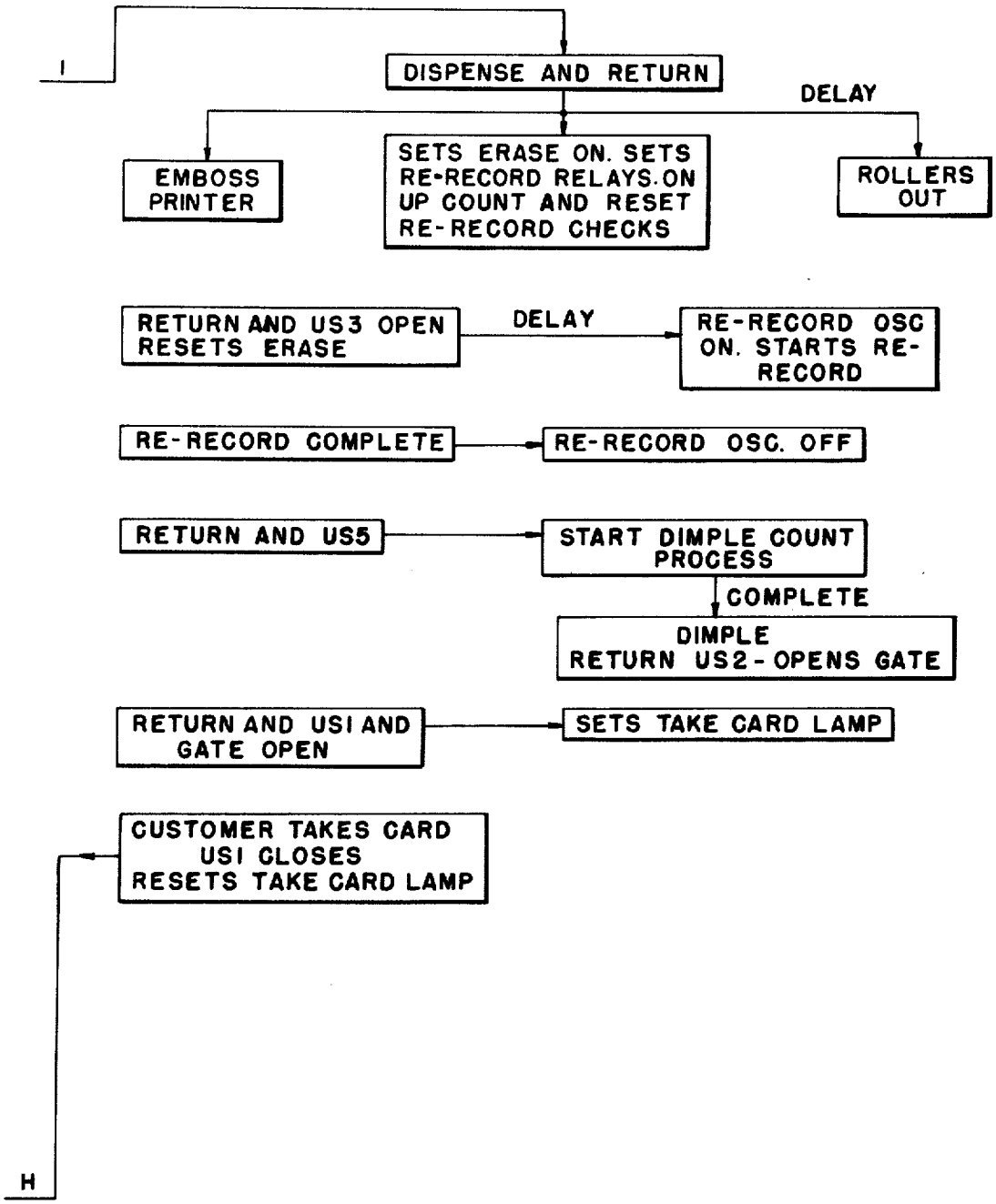

Returning to the sequence of operations shown on FIG. 16D, upon the returning movement of the card to the customer the microswitch $\mu$S3 is opened and this results in a resetting of the erase magnetic head, a time delay, and then a turning on of the oscillator and a starting of the re-record operation. As soon as the re-record operation has been completed, the oscillator system 142 is turned off.

As the card continues to move leftwardly as shown in FIG. 16A, on its way to being returned to the customer, the microswitch $\mu$S5 is actuated and this starts the dimple count process which is completed by a dimpling, perforating or punching of a mark in the security card 19 as shown in FIG. 5 in the next appropriate area.

As the card progresses along, the microswitch $\mu$S2 is actuated which opens the gate. With the gate open and the subsequent actuation of the microswitch $\mu$S1, the sign 7 designated "TAKE CARD" is illuminated to tell the customer to remove his security card 19 before the currency will be dispensed by the apparatus.

As the customer removes his security card, the microswitch $\mu$S1 closes, the sign 7 designated "TAKE CARD" is reset or reverts to its non-illuminated condition and the signal is sent via the line marked H to start the currency dispenser motor (FIG. 16C and FIG. 16D). At the same time a signal is transmitted over the line designated G to set a Timer 8 having an eight second duration before the apparatus reverts to a shutdown condition.

With reference to FIG. 16C, there is illustrated what transpires after the dispenser motor has been started. Upon occurrence of the dispense signal and the operation of the microswitch $\mu$S8, the gate of the safe 16 is unlocked, and, after a short delay, the safe gate opens for one second. Thereupon the safe gate closes actuating a microswitch $\mu$S9 which sets one of two failure bistables. After a short delay the safe gate locks and then the safe gate circuits send a signal to the fascia gate solenoids. Thereupon a microswitch $\mu$S17 is actuated which unlocks the fascia gate, and, after a short delay the facia gate opens for one second. Then the fascia gate closes actuating the microswitch $\mu$S18 which resets the other of the two failure bistables. After a short delay the fascia gate locks and the empty currency package return slot opens to accept the package 12 which the customer may deposit in the slot 5.

With reference to the upper left hand portion of FIG. 16C, let us consider what operations occur if the information is correct but it is determined that the card is expired. This occurs of course upon the twentieth use of the card and would indicate that an "expired" signal is transmitted from the comparator 134 (FIG. 12) via the line 136 to the decision unit 102 (FIG. 13). Under these set of circumstances, the decision unit generates a "dispense and retain" signal, rather than a "dispense and return" signal which would occur if the card was not expired. The dispense and retain signal sets the two failure bistables, upcounts the number of times used, operates the emboss printer, nd after a short delay sets the rollers out. After the rollers have been set, the microswitch $\mu$S5 is actuated which starts the dimple procedure. When this is completed, the dimple solenoid is operated and the microswitch $\mu$S2 is actuated. This causes the rollers out to be reset and sets the rollers in. The microswitch $\mu$S6 resets the failure bistables, and, at the same time, the sign 6 designated "CARD RETAINED" is set or illuminated. At the same time the Timer 8 is set for an 8 second duration before the apparatus reverts to a shutdown position.

With reference to the middle portion of FIG. 16B, let us consider what occurs when after the decision strobe it has been determined that the information is wrong or incorrect. After a short delay, a retain signal is generated. Following the first retain path, there is a resetting of the decision enable signal, a setting of the rollers out, and a setting of the second read level in order to read the security card 19 a second time to ensure that no error has been introduced by the apparatus itself by an improper reading of the card on the first trial. The second read level setting results in the inhibiting of the print out of the result of the transaction after the line feed and the inhibiting of the personal number subroutine. When the microswitch $\mu$S2 opens with the second read level set, the inward level is set again as indicated by the line designated B going from FIG. 16B to FIG. 16A.

If after following the same above-described procedure with the setting of the inward level and the consequent decision strobe determining that the information is again wrong, the second retain path should now be considered. This path leads to a setting of the rollers in, a resetting of the rollers out, the actuation of the microswitch $\mu$S6 to reset the failure bistables, the illumination of the sign 6 designated "CARD RETAINED," and the ultimate setting of the Timer 8 for an 8 second duration before the machine reverts to a shutdown condition. In other words, the second retain path results in a retention of the security card 19 by the apparatus and the eventual shutdown condition of the apparatus. This card will remain in the apparatus until it is inspected by the staff of the bank on the next business day, whereupon the customer to whom the inserted card 19 has been issued will be contacted to explain the unsuccessful transaction.

At this point, it would be beneficial to reconsider the information block diagram illustrated in FIGS. 11, 12 and 13. The scrambled or coded static data on magnetic strips 31 and 32 appears under the static data magnetic read heads 37. After the security card 19 has passed the static data read head 37, it operates the microswitch $\mu$S3 and thereupon the dynamic data of the two outer magnetic stripes 33 and 34 is read. As the outputs from the head 37 appear in the decoder and distributor (demultiplexer) 49, the data is entered into the store or register 53.

As the security card 19 leaves the dynamic data head 41 and resets the microswitch $\mu$S3, the output from the read head 41 is transmitted to the decoder and distributor (demultiplexer) 51 to process the incoming information. Then, the information is entered into the register or storage 77. It should be noted that the date, on line 119, is always available. When the security card 19 leaves the microswitch $\mu$S3, the dynamic read head 41 is reset and the information is in the store.

During a dispense condition, the re-record relay is energized, the erase head is turned on, and after some delay the security card 19 starts back toward the fascia 1 and contacts the microswitch $\mu$S3. The microswitch $\mu$S3 essentially starts the re-record process, but a monostable multivibrator is interposed to delay the start of the re-recording. The information is read out of the register or store 77, encoded and rearranged in the scrambler and distributor 116 and rewritten on the security card 19.

Although the article or security card 19 has been described in connection with a preferred embodiment of the currency dispensing apparatus, it would appear to those skilled in the art that such a card 19 may be employed for a host of other applications. For example, such an article or card 19 may be employed for identification purposes, for entrance into bank vaults or secret government facilities, and for any other purpose where only authorized personnel are to be admitted.

The novel currency dispensing apparatus can also be arranged to be "on-line" so that the exact balance remaining in the customer's account is checked very rapidly to ascertain whether the requested dispense operation will result in an overdrawn condition. In addition, the invention can be modified to permit the customer to request other than a predetermined amount of currency.

In addition to the various functions explained above it is apparent that this system can perform additional checks or comparison prior to indicating a valid security card. However only principal validity checks have been explained to prevent an unduly long description of the invention. In practice various parity bits and check codes are also verified prior to dispensing currency.

What is claimed is:

1. Apparatus for authenticating a credit or security card and its use in response to the introduction into said apparatus of said security card and the entering into said apparatus of predetermined information, comprising:

means for verifying that a particular security card is valid, said verifying means including an oscillator and a transducer for quantizing a characteristic of magnetic material deposited on discrete areas of said security card, and means for reading encoded information, representative of said characteristic, and data on said security card, means for permitting a user of said apparatus to enter personal identification information into said apparatus, means for determining if said personal identification information corresponds to said data, and means for authorizing the use of said security card only if the card is verified and if said personal identification information corresponds to said data.

2. An apparatus characterized in accordance with claim 1, wherein said information which is present on said security card is magnetically recorded on said security card in a coded or scrambled form, and said means for determining if said personal identification information corresponds to said data includes means for electronically decoding said coded or scrambled data.

3. An apparatus characterized in accordance with claim 1, including means for recording on said security card the total number of times said security card has been employed to obtain the dispensed items, and means to permit said apparatus to retain said security card when said security card has been employed for dispensing items a predetermined number of total times.

4. An apparatus characterized in accordance with claim 1, including means for normally returning said security card to said user before said items are dispensed to said user.

5. An apparatus characterized in accordance with claim 1, wherein said security card includes a body member having a first predetermined area within which there has been applied a random quantity of magnetic material, said security card also including a second predetermined area within which there has been recorded information which is representative of said random quantity of said magnetic material which has been applied within said first predetermined area, said oscillator for energizing said magnetic material and said transducer including associated circuitry for reading the value of the thus energized magnetic material, said information which is read by said reading means being representative of said random quantity of magnetic material, and said verifying means includes means for comparing said recorded information which is representative of said random quantity of magnetic material with the value obtained by reading said energized magnetic material.

6. An apparatus characterized in accordance with claim 1, wherein said security card is provided with indicia bearing a randomly-applied amount of magnetic material which is accurately measured before the card is issued to said user.

7. An apparatus characterized in accordance with claim 1, including means for recording on said security card the date of the most recent successful use of that particular security card and means to permit said apparatus to retain said card when said card is presented within a predetermined time after said most recent successful use of said security card.

8. An apparatus for dispensing articles desired by a user of said apparatus in response to the introduction in said apparatus of a valid security card and the entering into said apparatus of a secret memorized personal number, comprising, in combination:

means for permitting said user to introduce said security card into said apparatus;

means for reading and checking the data which is magnetically encoded in scrambled form on said security card;

means for determining the validity of said card;

a keyboard for permitting said user to enter into said apparatus said secret memorized personal number;

means for determining the validity or invalidity of said entered personal number by comparing said personal number with the data read from said security card;

said security card being provided with indicia bearing a randomly-applied amount of magnetic material which is accurately measured before the card is issued to said user;

the data representing the accurate measurement of the amount of magnetic material being encoded as part of said data which is present on said security card;

said reading and checking means including means for reading said indicia to obtain a signal representative of the amount of magnetic material borne by said indicia and means for comprising said signal with said data which represents the accurate measurement of the amount of said magnetic material;

means for dispensing said articles desired by said user only after said security card and said secret memorized personal number are both determined by said apparatus to be valid; and means for permitting said articles to be dispensed to said user only after said user has removed his security card from said apparatus.

9. An apparatus characterized in accordance with claim 8, including means for retaining said security card and for preventing the return of said security card to said user when said user has failed to enter into said apparatus the correct secret memorized personal number after a predetermined number of attempts to do so.

10. An apparatus characterized in accordance with claim 8, wherein said data is magnetically recorded on said security card in a scrambled or coded arrangement, and wherein said means for determining the validity of said security card which is introduced into said apparatus includes means for electronically decoding said scrambled or coded arrangement of data.

11. An article comprising, in combination:

a body member;

a first predetermined area on said body member;

said first predetermined area containing a quantity of material which is capable of being influenced by an electromagnetic field;

a second predetermined area on said body member, said second predetermined area containing data which is representative of said quantity of said material which lies within certain portions of said first predetermined area on said body member.

12. An article characterized in accordance with claim 11, wherein said quantity of material within said first predetermined area is capable of being detected and measured after said material is influenced by a predetermined electromagnetic field, and said data within said second predetermined area includes values mathematically related to the detected or measured quantity of material.

13. An article, such as a security card, a credit card or an identification card, comprising, in combination:

a body member;

a first predetermined area on said body member;

said first predetermined area containing a randomly-applied quantity of magnetic material;

a second predetermined area on said body member; and said second predetermined area containing data which is representative of said quantity of said magnetic material which lies within said first predetermined area on said body member.

14. An article characterized in accordance with claim 13, including a third predetermined area on said body member, said third predetermined area providing a visiblle indication of the total number of times said article has been employed for its intended purpose.

15. A security card for use in conjunction with an apparatus for dispensing items desired by a user of said apparatus, comprising, in combination:

a body member having a first predetermined area in the shape of an arrow for indicating the correct direction for inserting said security card into said apparatus;

said arrow containing a randomly distributed quantity of magnetic material portions of which are accurately measured before said security card is issued to said user;

said body member having a second predetermined area within which is encoded various recorded data;

and said recorded data includes information which is mathematically related to said accurately measured quantity of said magnetic material.

16. A security card characterized in accordance with claim 15, wherein said recorded data also includes information which corresponds to a personal number which is memorized by said user and which is required to be entered into said apparatus by said user before said apparatus will dispense the items desired.

17. A security card characterized in accordance with claim 15, including a third predetermined area on said body member wherein there is provided a visible indication of the total number of times said security card has been employed for a successful dispensing of said item.

18. An apparatus for verifying that a particular credit card is authorized for use, comprising:

a credit card including discrete areas of magnetic material deposited thereon and information encoded thereon which is mathematically related to a security value of the deposited magnetic material, means including an oscillator and a transducer for determining the security value of the magnetic material deposited on said card, means for reading the encoded information on said card, means for comparing the security value and the encoded information and for ascertaining the validity of said credit card.

19. The apparatus of claim 18 wherein said transducer and oscillator determine said security value by measuring a predetermined plurality of said decrete areas of magnetic material.

20. The apparatus of claim 19 wherein said magnetic material is randomly applied.

21. The apparatus of claim 19 wherein said encoded information is in a scrambled form and said means for reading includes electronically unscrambling said information.

*22. Apparatus which authenticates a credit, identification, or security card or the like and authorizes its use in the apparatus, comprising:*

*means for verifying that a particular card is valid;*

*said verifying means including a transducer for evaluating, after said card is introduced into the apparatus for use, a unique characteristic of magnetic material deposited on said card;*

*said verifying means further including means for reading information encoded on said card representative of said unique characteristic of said energized magnetic material, obtained by a prior evaluation of said magnetic material, and means for comparing said information and the evaluation of the unique characteristic of said magnetic material, after the card has been introduced into the apparatus for use, in order to determine if the unique characteristic evaluated after the card is introduced corresponds to the unique characteristic obtained by said prior evaluation; and*

*means for authorizing the use of said security card only if the card is verified by determining a valid comparison of said unique characteristic which has been evaluated after the card is introduced into the apparatus for use and said representative information of the unique characteristic obtained by said prior evaluation.*

*23. An apparatus characterized in accordance with claim 22, wherein said security card includes a body member having a first predetermined area within which there has been applied a magnetic material, which has a unique characteristic value, said security card also including a second predetermined area within which there has been recorded information which is representative of said unique characteristic value of said magnetic material which has been applied within said first predetermined area, said transducer including associated circuitry for reading the magnetic material to determine the value of said unique characteristic, and*

*said verifying means includes means for comparing said recorded information which is representative of said unique characteristic of magnetic material with*

*the value of said unique characteristic obtained by reading said magnetic material.*

*24. An apparatus characterized in accordance with claim 22, wherein said security card is provided with indicia bearing randomly-applied magnetic material which is evaluated before the card is issued to said user to determine the value of said unique characteristic.*

*25. An apparatus for dispensing articles desired by a user of said apparatus in response to the introduction into said apparatus of a valid security card, said security card being provided with magnetic material applied in an area of the card which may be scanned by a transducer, which magnetic material has been accurately measured to derive and establish a characteristic thereof, before the card is issued to said user, which characteristic is unique with said security card and distinct from other characteristics of other like cards intended for use in the apparatus, and in response to entering into said apparatus of a secret memorized personal number, comprising in combination:*

*means for receiving said security card into said apparatus; and,*

*a transducer for reading an area of the magnetic material on the card to obtain a signal representative of the unique characteristic of such magnetic material after said card has been introduced into said apparatus; and,*

*means for reading and checking data which is present and magnetically encoded in scrambled form on said card when said card is introduced, at least some of said encoded data representing the prior accurate measurement of the unique characteristic of magnetic material which is present on said security card;*

*means for determining the validity of said card including means for comparing said representative signal with said encoded data which is representative of the unique characteristic derived from said card at a prior reading of the magnetic material; and*

*means for said user to enter into said apparatus a secret memorized personal number;*

*means for determining the validity or invalidity of said entered personal number by comparing said personal number with other information associated with said security card; and*

*means for dispensing said articles desired by said user only after said security card and said secret memorized personal number are both determined by said apparatus to be valid.*

*26. A series of articles, such as security cards, credit cards or identification cards, each of which comprises in combination:*

*a body member;*

*a first predetermined area containing magnetic material having a unique characteristic associated with said specific card, which differs from similar but different characteristics of other like cards of the series; and*

*a second predetermined area on said body member containing data which is representative of said unique characteristic of said magnetic material contained in said first predetermined area of said body member.*

*27. An article according to claim 26 wherein said magnetic material is randomly positioned due to a random application of a quantity of magnetic material to said first predetermined area.*

*28. An article characterized in accordance with claim 27, wherein said randomly-positioned areas of magnetic material of said first predetermined area comprise two or more magnetic spots which are randomly applied in said area during manufacture.*

*29. An article according to claim 26 wherein said data is encoded and has a functional relationship with a number which may be derived from the magnetic material in said first predetermined area when said magnetic material has been energized by an electromagnetic field.*

*30. An article according to claim 26 wherein the data contained in said second predetermined area is derived by counting discrete areas of magnetic material in said first predetermined areas.*

*31. An article according to claim 26 wherein said data contained in said second predetermined area includes a number representative of a count of discrete magnetic areas of said first predetermined area, which number has undergone a mathematical transformation before being recorded on said article in said first predetermined area, said mathematical transformation making possible comparison of said data and a reading of said magnetical material of said first predetermined area for correspondence when said article is presented for use to determine whether use of said article is authorized.*

*32. An article characterized in accordance with claim 26, wherein said quantity of material within said first predetermined area is capable of being detected and measured after said material is influenced by a predetermined electromagnetic field, and said data within said second predetermined area includes values mathematically related to the detected or measured quantity of material.*

*33. An article comprising in combination:*

*a body member;*

*a predetermined area on said body member;*

*said predetermined area containing a plurality of randomly-positioned areas of magnetic material which is adapted to be read to determine a number unique to said article, as compared with other like articles, by evaluation of said magnetic material by reading and obtaining a measure of the plurality of randomly-positioned areas of magnetic material to derive said unique number which is measurably associated with the areas read and which is adapted to be stored data on the card, such that a subsequent derivation of said number can be compared with said unique number at the subsequent time it is derived; and,*

*a second predetermined area on said body member, said second predetermined area containing said stored data which is representative of said unique number and measurably associated with a count of said randomly-positioned areas of magnetic material which lie within certain positions of said first predetermined area on said body member and which stored data has been derived by a prior reading of said randomly-positioned areas of said other first predetermined area and recorded in said second predetermined area for use in said comparison at said subsequent time.*

*34. An article characterized in accordance with claim 33, wherein said randomly-positioned areas of magnetic material of said first predetermined area are electromagnetically energized.*

*35. An article characterized in accordance with claim 33, wherein said number which is measurably associated with said randomly-positioned areas of magnetic material of said first predetermined area is functionally related to said representative stored data of said second predetermined area via a predetermined mathematical transformation.*

36. An article characterized in accordance with claim 35, wherein said unique number is subjected to said predetermined mathematical transformation to obtain said stored data which is measurably associated with said randomly-positioned areas of said first predetermined area such that said representative stored data can be compared to said unique number when said unique number falls within predetermined parameters for said representative stored data.

37. An article characterized in accordance with claim 33, wherein said randomly-positioned areas of magnetic material of said predetermined area comprise two or more magnetic spots which are randomly applied in said area during manufacture.

38. An article characterized in accordance with claim 33, including a third predetermined area on said body member, said third predetermined area providing a visible indication of the total number of times said article has been employed for its intended purpose.

39. An apparatus for verifying authorized use of a particular credit card or the like having deposited thereon magnetic material which has a unique characteristic associated with said particular card and which may be derived therefrom by measurement and which card has information encoded thereon which is mathematically related to said measured characteristic of the deposited magnetic material, comprising:

means including a transducer for determining a measure of the characteristic of the magnetic material deposited on said card;

means for reading the encoded information on said card;

means for comparing the measure of the particular characteristic of said card and the encoded information read from the card, and for ascertaining the validity of said card by determining that a mathematical relationship exists between said characteristic and said encoded information.

40. The apparatus of claim 39, wherein said transducer is used to determine said security value by measuring a predetermined plurality of said discrete areas of magnetic material and provides its output to a comparator.

41. An apparatus for dispensing one or more items desired by a user of said apparatus in response to the introduction into said apparatus of a security card and the entering separately into said apparatus of predetermined information, comprising, in combination:

means for receiving a security card into said apparatus, each said security card having associated therewith a number recorded on the card and having two different data representations of the number;

means for reading the two recorded data representations of said number on the card and means for determining the validity or invalidity of the card by comparing the two data representations of the number which are recorded on the card;

means for reading data which is magnetically recorded on said security card in a coded or scrambled form;

means for permitting said user to enter separately into said apparatus said predetermined information;

means for determining the validity or invalidity of said entered predetermined information by electronically decoding said coded or scrambled form of data and comparing the decoded data with said predetermined information; and means for dispensing said items desired by said user only if said security card and said predetermined information are both determined by said apparatus to be valid.

42. Apparatus as claimed in claim 41 for dispensing currency desired by a user of said apparatus in response to the introduction into said apparatus of a valid security card and the entering separately into said apparatus by said user of a secret memorized personal number, wherein said means for reading said two recorded data representations includes means for energizing a predetermined area of said security card, which area contains randomly-positioned magnetic material constituting one data representation of said number, and this reading means also includes means for counting the energized magnetic material, and said means for determining the validity or invalidity of the introduced security card includes means for comparing a number derived by said count of energized magnetic material with a value constituting the other data representation and that was encoded on said security card before said security card was issued to said user, and said means for permitting said user to enter into said apparatus said predetermined information is for entering said secret memorized personal number.

43. Apparatus as claimed in claim 42 including means for recording on said security card the total number of times said security card has been employed to obtain the dispensed items, and means to permit said apparatus to retain said security card when said security card has been employed for dispensing items a predetermined total number of times.

44. Apparatus as claimed in claim 41 and arranged to receive from a user said security card which includes a body member having a first predetermined area which may be read by a transducer within which there has been randomly-applied areas of magnetic material, said security card also including a second predetermined area within which there has been recorded data which is representative of a characteristic of said magnetic material which has been randomly applied within said first predetermined area, wherein said means for reading said recorded data representations includes a means for energizing said magnetic material and a magnetic reading head with associated counting circuitry for counting and reading the thus energized magnetic material and deriving a random number therefrom and representative thereof, and said means for determining the validity or invalidity of said security card includes means for comparing said recorded data which is representative of said randomly-applied magnetic material with the amount obtained from said energized magnetic material.

45. Apparatus as claimed in claim 41 and arranged to receive from a user said security card provided with randomly-applied magnetic material in a data track which data track was accurately measured before the card was issued to said user.

46. A series of articles, such as security cards, credit cards or identification cards, each of which comprises in combination:

a body member;

a first predetermined area containing magnetic material having a unique characteristic associated with said specific card, which differs from similar but different characteristics of other like cards of the series, said magnetic material is randomly positioned due to random application of magnetic material to said first predetermined area; and a second predetermined area on said body member containing data which is representative of said

*unique characteristic of said magnetic material contained in said first predetermined area of said body member.*

*47. An article according to claim 46 wherein said data is encoded and has a functional relationship with a number which may be derived from the magnetic material in said first predetermined area when said magnetic material has been energized by an electromagnetic field.*

*48. An article according to claim 46 wherein the data contained in said second predetermined area is derived by counting discrete areas of magnetic material in said first predetermined areas.*

*49. An article according to claim 46 wherein said data contained in said second predetermined area includes a number representative of a count of discrete magnetic areas of said first predetermined area, which number has undergone a mathematical transformation before being recorded on said article in said first predetermined area, said mathematical transformation making possible comparison of said data and a reading of said magnetic material of said first predetermined area for correspondence when said article is presented for use to determine whether use of said article is authorized.*

*50. An article characterized in accordance with claim 46 wherein said magnetic material within said first predetermined area is capable of being detected and measured after said material is influenced by a predetermined electro-magnetic field, and said data within said second predetermined area includes values mathematically related to the detected or measured magnetic material of said first predetermined area.*

*51. An article characterized in accordance with claim 46 wherein said randomly-positioned areas of magnetic material of said first predetermined area comprise two or more magnetic spots which are randomly applied in said area during manufacture.*

* * * * *

UNITED STATES PATENT OFFICE

CERTIFICATE OF CORRECTION

PATENT NO. : Reissue 28,701

DATED : January 27, 1976

INVENTOR(S) : John David Edwards et al

It is certified that error appears in the above-identified patent and that said Letters Patent are hereby corrected as shown below:

Col. 1, line 27, should be --of the predetermined--.
Col. 2, line 49, should be --when taken--.
Col. 5, line 28, should be --cash dispensing--,
line 55, should be --and write upon--.
Col. 8, line 47, should be --where N--.
Col. 9, line 53, should be --a six digit--.
Col. 10, line 46, should be --it must--.
Col. 11, line 30, should be --read head--.
line 42, should be --static is--.
Col. 12, line 43, should be --randomly applied--.
Col. 14, line 24, should be --have been--.
Col. 20, line 50, should be --for comparing--.
Col. 22, line 18, should be --discrete areas--.

Signed and Sealed this eighteenth Day of May 1976

[SEAL]

*Attest:*

RUTH C. MASON
*Attesting Officer*

C. MARSHALL DANN
*Commissioner of Patents and Trademarks*